United States Patent
Reddy et al.

(10) Patent No.: US 12,150,082 B2
(45) Date of Patent: Nov. 19, 2024

(54) SCALABLE AND DISTRIBUTED INTER-CLUSTER COORDINATION IN UWB

(71) Applicant: QUALCOMM Incorporated, San Diego, CA (US)

(72) Inventors: Varun Amar Reddy, La Jolla, CA (US); Alexandros Manolakos, Escondido, CA (US); Pooria Pakrooh, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 354 days.

(21) Appl. No.: 17/806,809

(22) Filed: Jun. 14, 2022

(65) Prior Publication Data
US 2023/0403671 A1 Dec. 14, 2023

(51) Int. Cl.
*H04W 64/00* (2009.01)
*H04W 72/1268* (2023.01)

(52) U.S. Cl.
CPC ....... *H04W 64/00* (2013.01); *H04W 72/1268* (2013.01)

(58) Field of Classification Search
CPC ........ G06V 20/50; G06V 20/60; G06V 20/64; G06V 20/68; G06V 20/66; G06V 20/647;
(Continued)

(56) References Cited

U.S. PATENT DOCUMENTS

| | | | |
|---|---|---|---|
| 2007/0253345 A1* | 11/2007 | Habetha | H04W 84/20 370/254 |
| 2017/0118754 A1* | 4/2017 | Kang | H04W 72/541 |

(Continued)

FOREIGN PATENT DOCUMENTS

EP      3910434 A1    11/2021

OTHER PUBLICATIONS

Decawave: "DWM1001 System Overview and Performance", Dec. 18, 2017 (Dec. 18, 2017), pp. 1-42, XP055575380, Dublin, pp. 13-19, pp. 26-29, pp. 33-39, Sections: 1.3, 4.1, 4.6, 9.1.1, 9.1.10, 9.1.11, 9.1.12.

(Continued)

*Primary Examiner* — Margaret G Mastrodonato
(74) *Attorney, Agent, or Firm* — Weaver Austin Villeneuve & Sampson LLP/QUALCOMM

(57) ABSTRACT

In some implementations, a ultra-wideband (UWB) device comprises a Global Anchor for a network of UWB anchors having a plurality of clusters and initiator anchors (Init-Anchors). The Global Anchor may obtain metric information comprising a centrality metric value of each Init-Anchor from information communicated to the Global-Anchor in a first control phase. The Global Anchor may determine a slot schedule for a second control phase, wherein: determining the slot schedule is based on the centrality metric values of the plurality of Init-Anchors; the slot schedule comprises an allocation of time slots of the second control phase among the plurality of Init-Anchors for wireless radio frequency (RF) communication; and the allocation of time slots includes a first set of time slots for upstream communication followed by a second set of time slots for downstream communication. The Global Anchor may send the slot schedule to an Init-Anchor of the plurality of Init-Anchors.

30 Claims, 12 Drawing Sheets

(58) Field of Classification Search
CPC .... G06V 10/87; G06V 10/765; G06V 10/764; G06V 10/82
See application file for complete search history.

(56) References Cited

U.S. PATENT DOCUMENTS

| | | | |
|---|---|---|---|
| 2020/0205172 A1* | 6/2020 | Elliott | H04W 72/12 |
| 2022/0386214 A1* | 12/2022 | Kim | H04W 40/026 |
| 2023/0019120 A1* | 1/2023 | Koo | H04W 64/006 |
| 2023/0128414 A1* | 4/2023 | Seo | H04L 5/0048 |
| | | | 370/329 |
| 2023/0276403 A1 | 8/2023 | Reddy et al. | |

OTHER PUBLICATIONS

International Search Report and Written Opinion—PCT/US2023/019878—ISA/EPO—Aug. 30, 2023.

* cited by examiner

SCALABLE AND DISTRIBUTED INTER-CLUSTER COORDINATION IN UWB

BACKGROUND

1. Field of Disclosure

The present disclosure relates generally to the field of radiofrequency (RF)-based position determination (or positioning) of an electronic wireless device. More specifically, the present disclosure relates to ultra-wideband (UWB)-based positioning.

2. Description of Related Art

The positioning of devices can have a wide range of consumer, industrial, commercial, military, and other applications. UWB-based positioning offers a highly-accurate, low-power positioning solution relative to other RF-based positioning techniques for wireless electronic devices.

BRIEF SUMMARY

An example method for inter-cluster coordination in ultra-wideband (UWB) positioning, according to this disclosure, may comprise obtaining metric information at a Global-Anchor for a network of UWB anchors comprising a plurality of clusters and a plurality of initiator anchors (Init-Anchors), wherein each cluster comprises a corresponding Init-Anchor, the metric information comprises a centrality metric value of each Init-Anchor of the plurality of Init-Anchors, the centrality metric value of a respective Init-Anchor being indicative of a number of hops of the respective Init-Anchor to other UWB anchors in the network, and the metric information is included in or derived from information communicated from the plurality of Init-Anchors to the Global-Anchor in a first control phase of the network of UWB anchors. The method also may comprise determining, with the Global-Anchor, a slot schedule for a second control phase of the network of UWB anchors, wherein: determining the slot schedule is based on the centrality metric values of the plurality of Init-Anchors. The method also may comprise the slot schedule comprises an allocation of time slots of the second control phase among the plurality of Init-Anchors for wireless radio frequency (RF) communication. The method also may comprise the allocation of time slots includes a first set of time slots for upstream communication followed by a second set of time slots for downstream communication. The method also may comprise sending the slot schedule from the Global-Anchor to an Init-Anchor of the plurality of Init-Anchors.

An example Global-Anchor of a network of ultra-wideband (UWB) anchors, according to this disclosure, may comprise a transceiver, a memory, one or more processors communicatively coupled with the transceiver and the memory, wherein the one or more processors are configured to obtain metric information regarding the network of UWB anchors, wherein: the network of UWB anchors comprises a plurality of clusters and a plurality of initiator anchors (Init-Anchors), each cluster comprises a corresponding Init-Anchor, the metric information comprises a centrality metric value of each Init-Anchor of the plurality of Init-Anchors, the centrality metric value of a respective Init-Anchor being indicative of a number of hops of the respective Init-Anchor to other UWB anchors in the network, and the metric information is included in or derived from information communicated from the plurality of Init-Anchors to the Global-Anchor in a first control phase of the network of UWB anchors. The one or more processors further may be configured to determine a slot schedule for a second control phase of the network of UWB anchors, wherein: determining the slot schedule is based on the centrality metric values of the plurality of Init-Anchors. The one or more processors further may be configured to the slot schedule comprises an allocation of time slots of the second control phase among the plurality of Init-Anchors for wireless radio frequency (RF) communication. The one or more processors further may be configured to the allocation of time slots includes a first set of time slots for upstream communication followed by a second set of time slots for downstream communication. The one or more processors further may be configured to send the slot schedule via the transceiver to an Init-Anchor of the plurality of Init-Anchors.

According to this disclosure, an example non-transitory computer-readable medium stores instructions for inter-cluster coordination in ultra-wideband (UWB) positioning, the instructions comprising code for obtaining metric information at a Global-Anchor for a network of UWB anchors comprising a plurality of clusters and a plurality of initiator anchors (Init-Anchors), wherein each cluster comprises a corresponding Init-Anchor, the metric information comprises a centrality metric value of each Init-Anchor of the plurality of Init-Anchors, the centrality metric value of a respective Init-Anchor being indicative of a number of hops of the respective Init-Anchor to other UWB anchors in the network, and the metric information is included in or derived from information communicated from the plurality of Init-Anchors to the Global-Anchor in a first control phase of the network of UWB anchors. The instructions further may comprise code for determining, with the Global-Anchor, a slot schedule for a second control phase of the network of UWB anchors, wherein: determining the slot schedule is based on the centrality metric values of the plurality of Init-Anchors. The instructions further may comprise code for the slot schedule comprises an allocation of time slots of the second control phase among the plurality of Init-Anchors for wireless radio frequency (RF) communication. The instructions further may comprise code for the allocation of time slots includes a first set of time slots for upstream communication followed by a second set of time slots for downstream communication. The instructions further may comprise code for sending the slot schedule from the Global-Anchor to an Init-Anchor of the plurality of Init-Anchors.

An example apparatus for inter-cluster coordination in ultra-wideband (UWB) positioning, according to this disclosure, may comprise means for obtaining metric information at a Global-Anchor for a network of UWB anchors comprising a plurality of clusters and a plurality of initiator anchors (Init-Anchors), wherein: each cluster comprises a corresponding Init-Anchor, the metric information comprises a centrality metric value of each Init-Anchor of the plurality of Init-Anchors, the centrality metric value of a respective Init-Anchor being indicative of a number of hops of the respective Init-Anchor to other UWB anchors in the network, and the metric information is included in or derived from information communicated from the plurality of Init-Anchors to the Global-Anchor in a first control phase of the network of UWB anchors. The apparatus further may comprise means for determining, with the Global-Anchor, a slot schedule for a second control phase of the network of UWB anchors, wherein: determining the slot schedule is based on the centrality metric values of the plurality of Init-Anchors. The apparatus further may comprise the slot schedule comprises an allocation of time slots of the second control phase among the plurality of Init-Anchors for wireless radio frequency (RF) communication. The apparatus further may comprise the allocation of time slots includes a first set of time slots for upstream communication followed by a second set of time slots for downstream communication. The apparatus further may comprise means for sending the slot schedule from the Global-Anchor to an Init-Anchor of the plurality of Init-Anchors.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

The following description is directed to certain implementations for the purposes of describing innovative aspects of various embodiments. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) 802.15.4 standards for ultra-wideband (UWB), IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multiple channels or paths.

Figure 1:
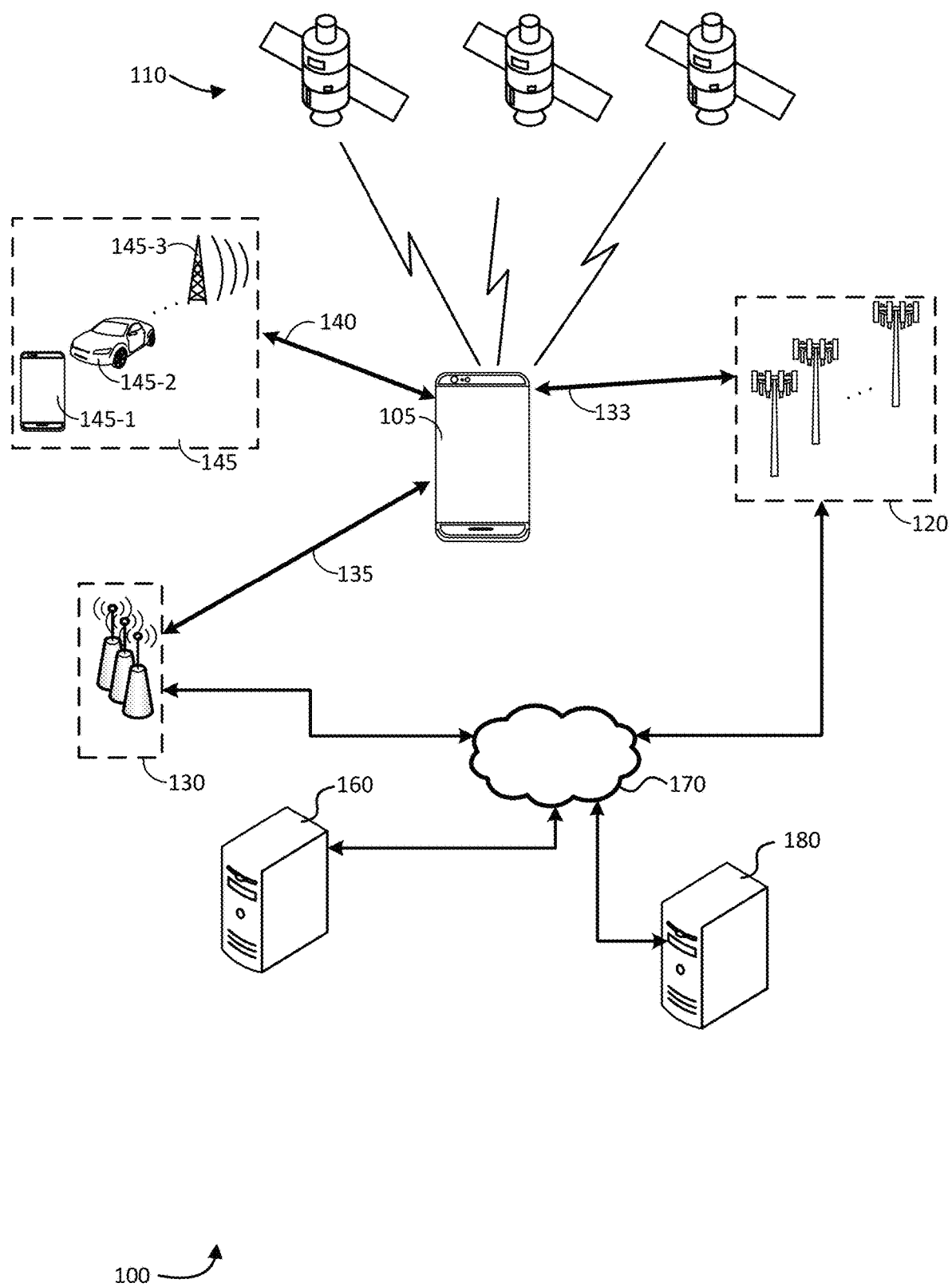
FIG. 1 is a simplified illustration of a positioning system that can use and/or complement the techniques provided herein for ultra-wideband (UWB)-based positioning of mobile device.

As previously noted, UWB-based positioning offers a highly-accurate, low-power positioning solution relative to other RF-based positioning techniques for wireless electronic devices. UWB-based positioning can be used in industrial applications, such as by robots and/or other Internet of Things (IoT) devices in a factory setting, indoor positioning of consumer electronics, and more. Although UWB-based positioning may be used in an ad hoc manner as a standalone positioning technique between electronic devices capable of UWB positioning (also referred to herein as "UWB devices"), in some embodiments UWB-based positioning may be used as one of many techniques for positioning an electronic device in a positioning system. FIG. 1 provides an example of such a positioning system.

Further, unless otherwise specified, the term "positioning" as used herein (including, for example, UWB-based positioning, cellular-based positioning, and hybrid cellular/UWB positioning) may include absolute location determination, relative location determination, ranging, or a combination thereof. Such positioning may include and/or be based on timing, angular, phase, or power measurements, or a combination thereof (which may include RF sensing measurements) for the purpose of location or sensing services.

As previously noted, UWB-based positioning offers a highly-accurate, low-power positioning solution relative to other RF-based positioning techniques for wireless electronic devices. UWB-based positioning can be used in industrial applications, such as by robots and/or other Internet of Things (IoT) devices in a factory setting, indoor positioning of consumer electronics, and more. Although UWB-based positioning may be used in an ad hoc manner as a standalone positioning technique between electronic devices capable of UWB positioning (also referred to herein as "UWB devices"), in some embodiments UWB-based positioning may be used as one of many techniques for positioning an electronic device in a positioning system. FIG. 1 provides an example of such a positioning system.

FIG. 1 is a simplified illustration of a positioning system 100 in which a mobile device 105, location server 160, and/or other components of the positioning system 100 can use and/or complement the techniques provided herein for UWB-based positioning of mobile device 105, according to an embodiment. The techniques described herein may be implemented by one or more components of the positioning system 100. The positioning system 100 can include: a mobile device 105; one or more satellites 110 (also referred to as space vehicles (SVs)) for a Global Navigation Satellite System (GNSS) such as the Global Positioning System (GPS), GLONASS, Galileo or Beidou; base stations 120; access points (APs) 130; location server 160; network 170; and external client 180. Generally put, the positioning system 100 can estimate a location of the mobile device 105 based on RF signals received by and/or sent from the mobile device 105 and known locations of other components (e.g., GNSS satellites 110, base stations 120, APs 130) transmitting and/or receiving the RF signals. Additional details regarding particular location estimation techniques are discussed hereafter.

It should be noted that FIG. 1 provides only a generalized illustration of various components, any or all of which may be utilized as appropriate, and each of which may be duplicated as necessary. Specifically, although only one mobile device 105 is illustrated, it will be understood that many mobile devices (e.g., hundreds, thousands, millions, etc.) may utilize the positioning system 100. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to location server 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by the 3rd Generation Partnership Project (3GPP). Network 170 may also include more than one network and/or more than one type of network. In a wireless cellular network (e.g., LTE or 5G), the mobile device 105 may be referred to as a user equipment (UE)

The base stations 120 and access points (APs) 130 may be communicatively coupled to the network 170. In some embodiments, the base station 120s may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. The functionality performed by a base station 120 in earlier-generation networks (e.g., 3G and 4G) may be separated into different functional components (e.g., radio units (RUs), distributed units (DUs), and central units (CUs)) and layers (e.g., L1/L2/L3) in view Open Radio Access Networks (O-RAN) and/or Virtualized Radio Access Network (V-RAN or vRAN) in 5G or later networks, which may be executed on different devices at different locations connected, for example, via fronthaul, midhaul, and backhaul connections. As referred to herein, a "base station" (or ng-eNB, gNB, etc.) may include any or all of these functional components. An AP 130 may comprise a Wi-Fi AP or a Bluetooth® AP or an AP having cellular capabilities (e.g., 4G LTE and/or 5G NR), for example. Thus, mobile device 105 can send and receive information with network-connected devices, such as location server 160, by accessing the network 170 via a base station 120 using a first communication link 133. Additionally or alternatively, because APs 130 also may be communicatively coupled with the network 170, mobile device 105 may communicate with network-connected and Internet-connected devices, including location server 160, using a second communication link 135, or via one or more other mobile devices 145.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." In some cases, a base station 120 may comprise multiple TRPs—e.g. with each TRP associated with a different antenna or a different antenna array for the base station 120. As used herein, the transmission functionality of a TRP may be performed with a transmission point (TP) and/or the reception functionality of a TRP may be performed by a reception point (RP), which may be physically separate or distinct from a TP. That said, a TRP may comprise both a TP and an RP. Physical transmission points may comprise an array of antennas of a base station 120 (e.g., as in a Multiple Input-Multiple Output (MIMO) system and/or where the base station employs beamforming). The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station).

As used herein, the term "cell" may generically refer to a logical communication entity used for communication with a base station 120, and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area (e.g., a sector) over which the logical entity operates.

Satellites 110 may be utilized for positioning of the mobile device 105 in one or more ways. For example, satellites 110 (also referred to as space vehicles (SVs)) may be part of a Global Navigation Satellite System (GNSS) such as the Global Positioning System (GPS), GLONASS, Galileo or Beidou. Positioning using RF signals from GNSS satellites may comprise measuring multiple GNSS signals at a GNSS receiver of the mobile device 105 to perform code-based and/or carrier-based positioning, which can be highly accurate. Additionally or alternatively, satellites 110 may be utilized for Non-Terrestrial Network (NTN)-based positioning, in which satellites 110 may functionally operate as TRPs (or TPs) of a network (e.g., LTE and/or NR network) and may be communicatively coupled with network 170. In particular, reference signals (e.g., PRS) transmitted by satellites 110 NTN-based positioning may be similar to those transmitted by base stations 120, and may be coordinated by a location server 160. In some embodiments, satellites 110 used for NTN-based positioning may be different than those used for GNSS-based positioning.

The location server 160 may comprise a server and/or other computing device configured to determine an estimated location of mobile device 105 and/or provide data (e.g., "assistance data") to mobile device 105 to facilitate location measurement and/or location determination by mobile device 105. According to some embodiments, location server 160 may comprise a Home Secure User Plane Location (SUPL) Location Platform (H-SLP), which may support the SUPL user plane (UP) location solution defined by the Open Mobile Alliance (OMA) and may support location services for mobile device 105 based on subscription information for mobile device 105 stored in location server 160. In some embodiments, the location server 160 may comprise, a Discovered SLP (D-SLP) or an Emergency SLP (E-SLP). The location server 160 may also comprise an Enhanced Serving Mobile Location Center (E-SMLC) that supports location of mobile device 105 using a control plane (CP) location solution for LTE radio access by mobile device 105. The location server 160 may further comprise a Location Management Function (LMF) that supports location of mobile device 105 using a control plane (CP) location solution for NR or LTE radio access by mobile device 105.

In a CP location solution, signaling to control and manage the location of mobile device 105 may be exchanged between elements of network 170 and with mobile device 105 using existing network interfaces and protocols and as signaling from the perspective of network 170. In a UP location solution, signaling to control and manage the location of mobile device 105 may be exchanged between location server 160 and mobile device 105 as data (e.g. data transported using the Internet Protocol (IP) and/or Transmission Control Protocol (TCP)) from the perspective of network 170.

As previously noted (and discussed in more detail below), the estimated location of mobile device 105 may be based on measurements of RF signals sent from and/or received by the mobile device 105. In particular, these measurements can provide information regarding the relative distance and/or angle of the mobile device 105 from one or more components in the positioning system 100 (e.g., GNSS satellites 110, APs 130, base stations 120). The estimated location of the mobile device 105 can be estimated geometrically (e.g., using multiangulation and/or multilateration), based on the distance and/or angle measurements, along with known position of the one or more components.

Although terrestrial components such as APs 130 and base stations 120 may be fixed, embodiments are not so limited. Mobile components may be used. For example, in some embodiments, a location of the mobile device 105 may be estimated at least in part based on measurements of RF signals 140 communicated between the mobile device 105 and one or more other mobile devices 145, which may be mobile or fixed. As illustrated, other mobile devices may include, for example, a mobile phone 145-1, vehicle 145-2, static communication/positioning device 145-3, or other static and/or mobile device capable of providing wireless signals used for positioning the mobile device 105, or a combination thereof. Wireless signals from mobile devices 145 used for positioning of the mobile device 105 may comprise RF signals using, for example, Bluetooth® (including Bluetooth Low Energy (BLE)), IEEE 802.11x (e.g., Wi-Fi®), Ultra Wideband (UWB), IEEE 802.15x, or a combination thereof. Mobile devices 145 may additionally or alternatively use non-RF wireless signals for positioning of the mobile device 105, such as infrared signals or other optical technologies.

Mobile devices 145 may comprise other mobile devices communicatively coupled with a cellular or other mobile network (e.g., network 170). When one or more other mobile devices 145 are used in the position determination of a particular mobile device 105, the mobile device 105 for which the position is to be determined may be referred to as the "target mobile device," and each of the other mobile devices 145 used may be referred to as an "anchor mobile device." (In a cellular/mobile broadband network, the terms "anchor UE" and "target UE" may be used.) For position determination of a target mobile device, the respective positions of the one or more anchor mobile devices may be known and/or jointly determined with the target mobile device. Direct communication between the one or more other mobile devices 145 and mobile device 105 may comprise sidelink and/or similar Device-to-Device (D2D) communication technologies. Sidelink, which is defined by 3GPP, is a form of D2D communication under the cellular-based LTE and NR standards. UWB may be one such technology by which the positioning of a target device (e.g., mobile device 105) may be facilitated using measurements from one or more anchor devices (e.g., mobile devices 145).

According to some embodiments, such as when the mobile device 105 comprises and/or is incorporated into a vehicle, a form of D2D communication used by the mobile device 105 may comprise vehicle-to-everything (V2X) communication. V2X is a communication standard for vehicles and related entities to exchange information regarding a traffic environment. V2X can include vehicle-to-vehicle (V2V) communication between V2X-capable vehicles, vehicle-to-infrastructure (V2I) communication between the vehicle and infrastructure-based devices (commonly termed roadside units (RSUs)), vehicle-to-person (V2P) communication between vehicles and nearby people (pedestrians, cyclists, and other road users), and the like. Further, V2X can use any of a variety of wireless RF communication technologies. Cellular V2X (CV2X), for example, is a form of V2X that uses cellular-based communication such as LTE (4G), NR (5G) and/or other cellular technologies in a direct-communication mode as defined by 3GPP. The mobile device 105 illustrated in FIG. 1 may correspond to a component or device on a vehicle, RSU, or other V2X entity that is used to communicate V2X messages. In embodiments in which V2X is used, the static communication/positioning device 145-3 (which may correspond with an RSU) and/or the vehicle 145-2, therefore, may communicate with the mobile device 105 and may be used to determine the position of the mobile device 105 using techniques similar to those used by base stations 120 and/or APs 130 (e.g., using multiangulation and/or multilateration). It can be further noted that mobile devices 145 (which may include V2X devices), base stations 120, and/or APs 130 may be used together (e.g., in a WWAN positioning solution) to determine the position of the mobile device 105, according to some embodiments.

An estimated location of mobile device 105 can be used in a variety of applications—e.g. to assist direction finding or navigation for a user of mobile device 105 or to assist another user (e.g. associated with external client 180) to locate mobile device 105. A "location" is also referred to herein as a "location estimate", "estimated location", "location", "position", "position estimate", "position fix", "estimated position", "location fix" or "fix". The process of determining a location may be referred to as "positioning," "position determination," "location determination," or the like. A location of mobile device 105 may comprise an absolute location of mobile device 105 (e.g. a latitude and longitude and possibly altitude) or a relative location of mobile device 105 (e.g. a location expressed as distances north or south, east or west and possibly above or below some other known fixed location (including, e.g., the location of a base station 120 or AP 130) or some other location such as a location for mobile device 105 at some known previous time, or a location of a mobile device 145 (e.g., another mobile device) at some known previous time). A location may be specified as a geodetic location comprising coordinates which may be absolute (e.g. latitude, longitude and optionally altitude), relative (e.g. relative to some known absolute location) or local (e.g. X, Y and optionally Z coordinates according to a coordinate system defined relative to a local area such a factory, warehouse, college campus, shopping mall, sports stadium, or convention center). A location may instead be a civic location and may then comprise one or more of a street address (e.g. including names or labels for a country, state, county, city, road and/or street, and/or a road or street number), and/or a label or name for a place, building, portion of a building, floor of a building, and/or room inside a building etc. A location may further include an uncertainty or error indication, such as a horizontal and possibly vertical distance by which the location is expected to be in error or an indication of an area or volume (e.g. a circle or ellipse) within which mobile device 105 is expected to be located with some level of confidence (e.g. 95% confidence).

The external client 180 may be a web server or remote application that may have some association with mobile device 105 (e.g. may be accessed by a user of mobile device 105) or may be a server, application, or computer system providing a location service to some other user or users which may include obtaining and providing the location of mobile device 105 (e.g. to enable a service such as friend or relative finder, or child or pet location). Additionally or alternatively, the external client 180 may obtain and provide the location of mobile device 105 to an emergency services provider, government agency, etc.

Figure 2A:
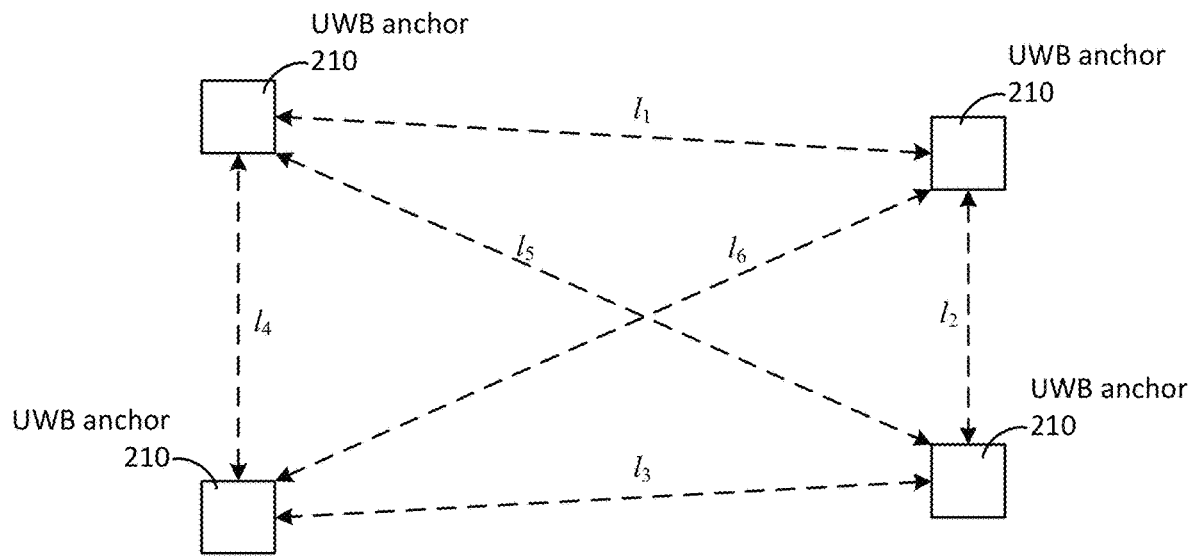
FIGS. 2A and 2B are simplified diagrams illustrating how UWB positioning may be performed in a network (e.g., at-hoc network) of UWB anchors.
Figure 2B:
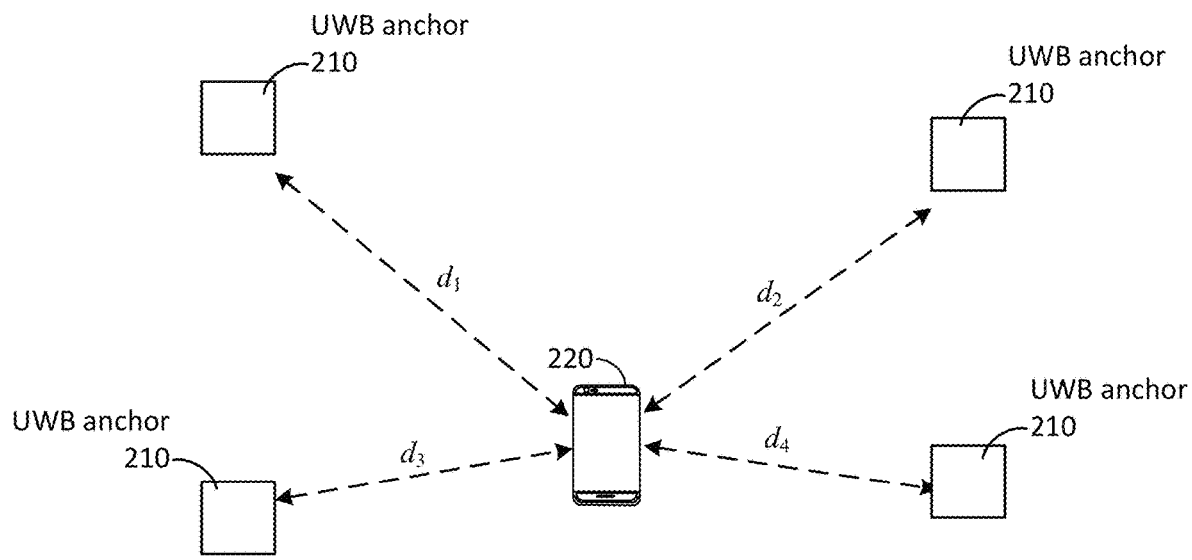

FIGS. 2A and 2B are simplified diagrams illustrating how UWB positioning may be performed in a network (e.g., at-hoc network) of UWB anchors 210. As referred to herein, "UWB anchors" (or simply "anchors") may comprise UWB devices with known locations that can be used to determine the position of a target 220, or "tag," using UWB RF signals. UWB positioning may be performed utilizing relevant standards, which enable high-accuracy, low power positioning.

If the position of one or more UWB anchors 210 is not yet known, such as in an ad-hoc network, an initial provisioning of the UWB anchors 210 may be performed. In the provisioning, UWB anchors 210 may perform ranging measurements to determine relative distances ($l_1$-$l_6$) between UWB devices 210, as illustrated in FIG. 2A. This can enable the UWB anchors 210 to determine the relative locations with one another and, if the absolute location of any UWB anchor 210 is known, the absolute locations (e.g., with respect to a coordinates system). Once the positions of the UWB anchors 210 is known, the determination of location of a target 220 can be made by determining the distances ($d_1$-$d_6$) between the UWB anchors 210 and target 220. These distances can be determined using a variety of positioning-related measurements and/or procedures. This can include, for example, Reference Signal Time Difference (RSTD), Time of Arrival (ToA), two-way ranging (TWR) (e.g., including single-sided TWR (SS-TWR) and/or double-sided TWR (DS-TWR)), Time Difference of Arrival (TDoA), and more. Additionally or alternatively, angle-based measurements may be made for positioning of the target 220, including angle of arrival (AoA) and/or Angle of departure (AoD).

UWB anchors 210 may vary in form and function. In some embodiments, for example, a UWB anchor 210 may comprise a mobile device such as a mobile phone with UWB functionality. Similarly, anchors 210 may comprise other personal electronics, such as laptops, tablets, personal media players, or the like. Further, as noted, UWB devices may comprise vehicles, drones, robots, or other mobile devices that may move autonomously, and may be used in consumer, industrial, military, and/or other applications. UWB anchors 210 may also comprise proprietary and/or dedicated RF beacons deployed at known locations for monitoring the location of tags or devices used in logistical applications. This can be done, for example, to track packages, shipping containers, or the like. UWB anchors 210 may be used in proximity applications to, for example, unlock the door as a user (e.g., an authorized user) approaches. UWB anchors 210 may also be deployed in a factory setting to monitor robots, assembled parts, or the like. UWB anchors 210 may also be used in other applications and/or device types.

A group of UWB anchors 210 may conduct sessions during which the UWB anchors 210 engage in direct communications (e.g., D2D communications) to coordinate the exchange of data, synchronize (e.g., for TDOA positioning). A group of UWB anchors 210 may be called a "cluster," and a network of UWB devices may comprise multiple clusters. Each cluster may include any number of UWB anchors 210, and different clusters may overlap, such that one or more UWB anchors 210 may be a part of one or more different clusters.

Figure 3A:
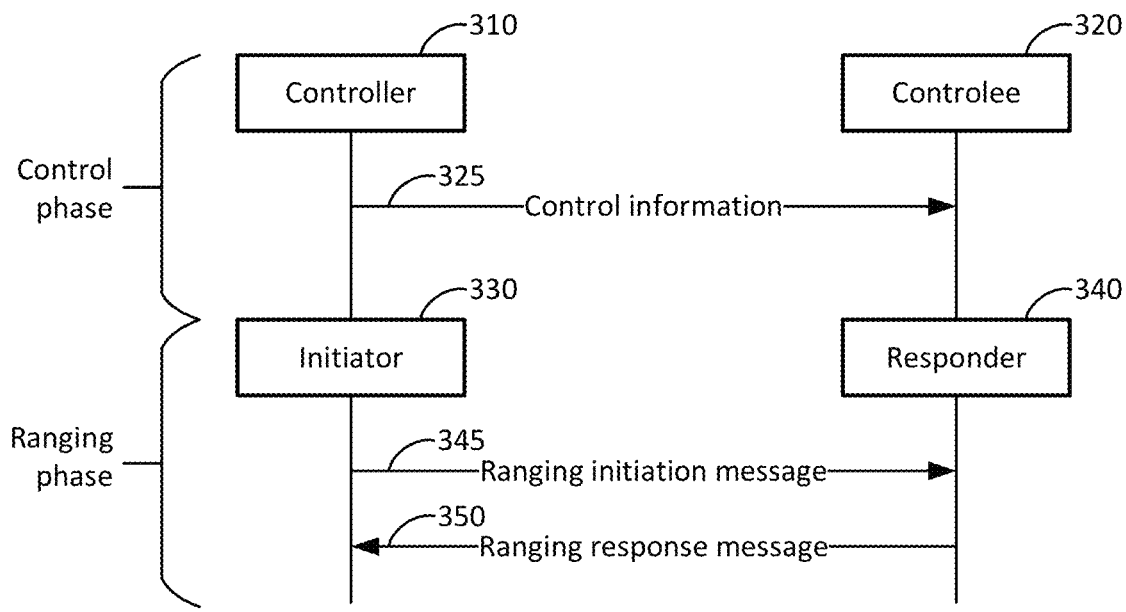
FIGS. 3A and 3B are flow diagrams illustrating the roles different devices may assume with regard to a UWB ranging session, according to an embodiment.

FIG. 3A is a flow diagram illustrating the roles different devices may assume with regard to a UWB ranging session (or simply a "UWB session"). Here, each UWB device may be referred to as an enhanced ranging device (ERDEV). ERDEVs may be referred to different terminologies (e.g. initiator/responder or controller/controlee) at different layers of the network stack. The terms initiator and responder (described hereafter) would be used at lower layers (e.g., at UWB physical (PHY) and media access control (MAC) layers), while the terms controller and controlee (also described hereafter) may be used at higher layers (e.g., an application layer of the ERDEVs).

As indicated, for a pair of ERDEVs communicating with each other, the controller 310 is an ERDEV that sends control information 325 to a receiving ERDEV, designated as the controlee 320. The control information 325 may include parameters for the UWB ranging session, such as timing, channel, etc. Although not illustrated, the controlee 320 can send acknowledgment to the control information 325, may negotiate changes to the parameters, and/or the like.

The exchange between controller 310 and controlee 320, including the sending of the control information 325 and subsequent related exchanges between controller 310 and controlee 320 regarding control information, may be conducted out of band (OOB) using a different wireless communication technology (e.g., Bluetooth or Wi-Fi), prior to a ranging phase. Put differently, a UWB session may be associated with a control phase and a ranging phase, where the control phase (which may take place on an OOB link) comprises a preliminary exchange between controller 310 and controlee 320 of parameter values for the ranging phase, and the subsequent ranging phase comprises the portion of the UWB session in which devices exchange messages within the UWB band for ranging measurements. (It can be noted, however, that some control information may be exchanged within the UWB band (e.g., a "ranging control phase" occurring in the first slot of a UWB round. Accordingly, some aspects of the control phase may be considered to occur in band, subsequent to the preliminary OOB exchange between the controller 310 and controlee 320.)

The UWB session may occur afterward, in accordance with the parameters provided in the control information. In the ranging phase of the UWB session, one ERDEV may take the role of an initiator 330 and the other ERDEV may take the role of a responder 340. As indicated in FIG. 3A, the initiator 330 may initiate UWB ranging by sending a ranging initiation message 345 to the responder 340, to which the responder 340 may reply with a ranging response message 350, and timing measurements may be made of these messages (by the devices receiving the messages) to perform two-way ranging (TWR). Depending on the parameters of the control information 325, additional exchanges may be made in the ranging phase between the initiator 330 and responder 340 to allow for additional ranging measurements.

Figure 3B:
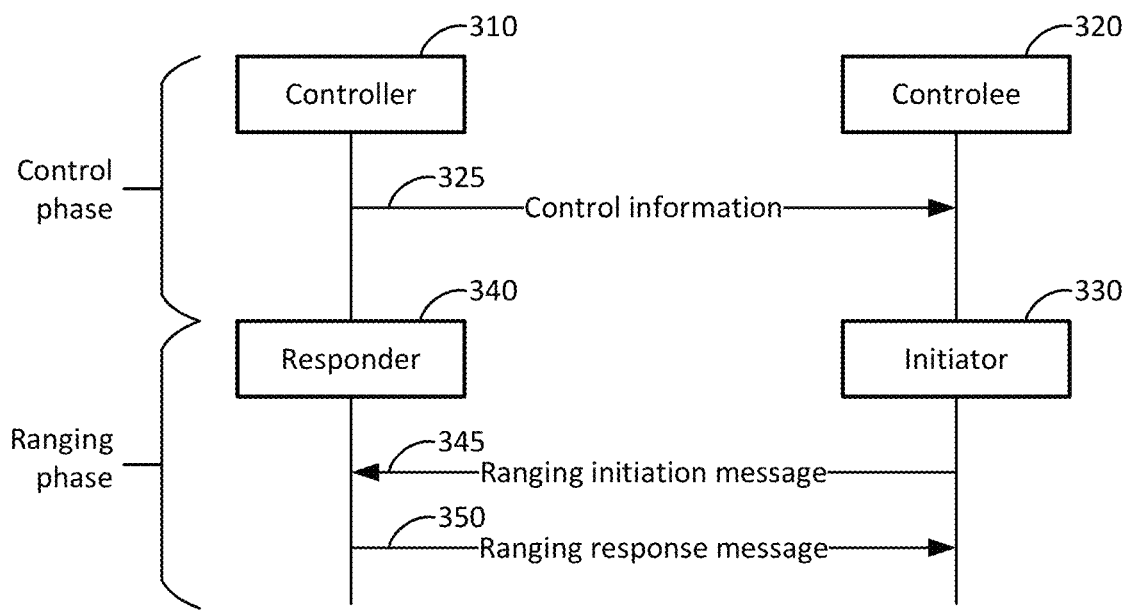

The roles of initiator 330 and responder 340 may be indicated in the control information 325. Further, as indicated in FIG. 3A, the controller 310 in the control phase may be the initiator 330 in the ranging phase of the UWB session. Alternatively, as indicated in FIG. 3B, the controller 310 in the control phase may be the responder 340 in the ranging phase. The determination of which device is initiator 330 and which is responder 340 may depend on the parameters set forth in the control information 325, in which case the controlee 320 correspondingly becomes either the responder 340 or the initiator 330. According to some embodiments, a controller/initiator may conduct ranging with multiple controlees/responders.

Figure 4:
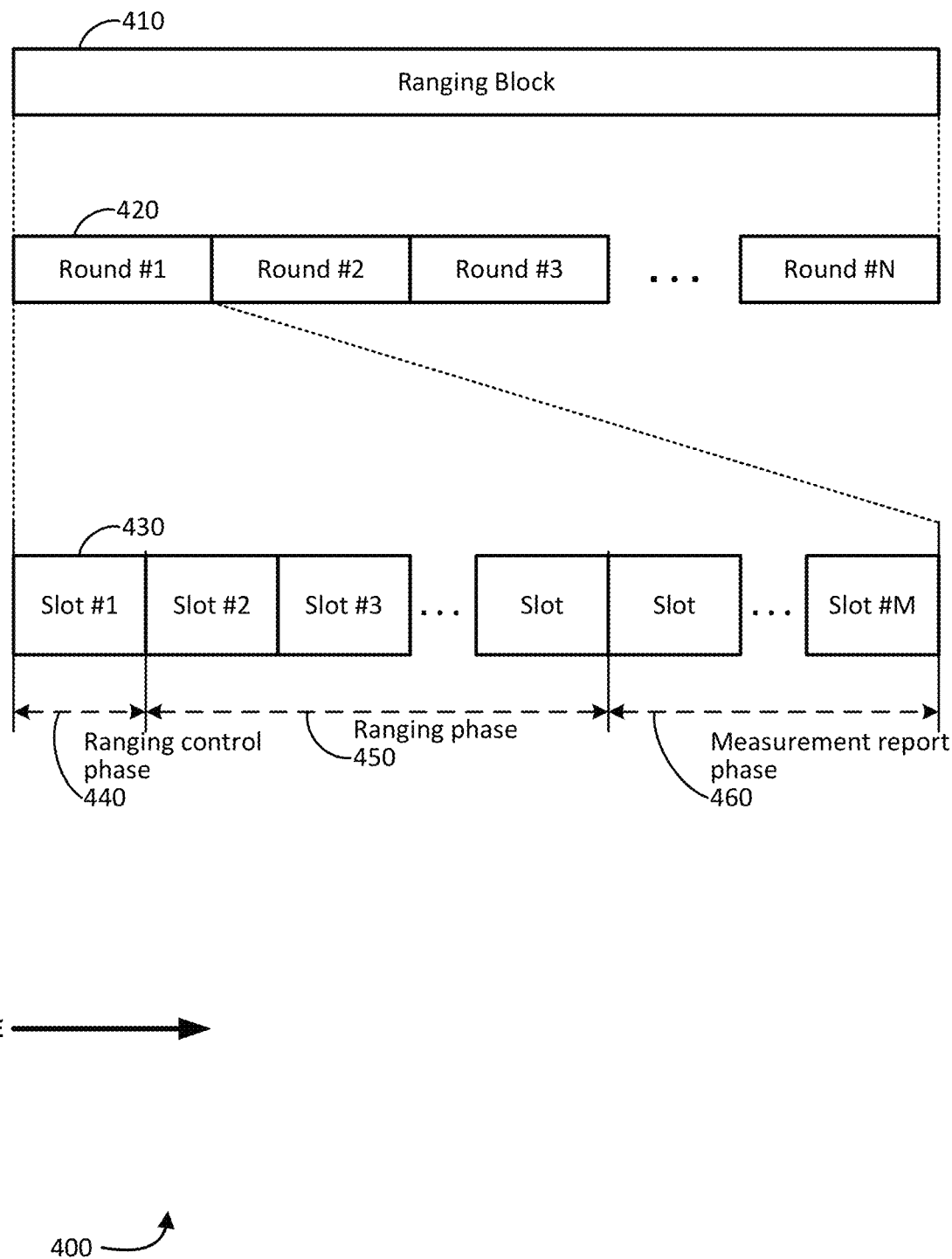
FIG. 4 is a timing diagram illustrating how timing may be measured and utilized within a UWB positioning session, according to an embodiment.

FIG. 4 is a timing diagram 400 illustrating how timing may be measured and utilized within a UWB positioning session. A UWB session may occur over a period of time divided into sub-portions according to a hierarchical structure. This timing comprises consecutive one or more consecutive ranging blocks 410, which may have a configurable duration (e.g., 200 ms). (For simplicity, only one ranging block 410 is shown in FIG. 4. However, a UWB session may utilize multiple ranging blocks, which may occur in succession.) Each ranging block 410 may be split into one or more successive rounds 420 (e.g., N rounds). The number and length of the rounds may be configurable. The rounds 420 are further split into different slots 430, which also may have a configurable number and length. According to some embodiments, to help reduce RF collisions, each cluster may use a single round in each ranging block 410 for UWB positioning. Neighboring clusters may utilize different rounds.

The slots within a round 420 may be allocated for different purposes. For example, the initial slot may be dedicated as the ranging control phase 440, in which an initiator UWB anchor for the cluster, or Init-Anchor, transmits control information for the other UWB anchors in the cluster. This information can include, for example, an allocation of slots among the different UWB anchors of the cluster. During the subsequent ranging phase 450, the different UWB anchors may transmit in accordance with the allocated slot. That is, each anchor may be allocated a corresponding slot in the ranging phase 450 to transmit one or more ranging signals. The ranging phase 450 may be followed by a measurement report phase 460 in which UWB anchors in a cluster may report measurements (e.g., of signals measured during the ranging phase 450).

In some UWB anchor networks, multiple clusters may exist. These clusters may overlap to allow communication between clusters. An example is provided in FIG. 5A.

Figure 5A:
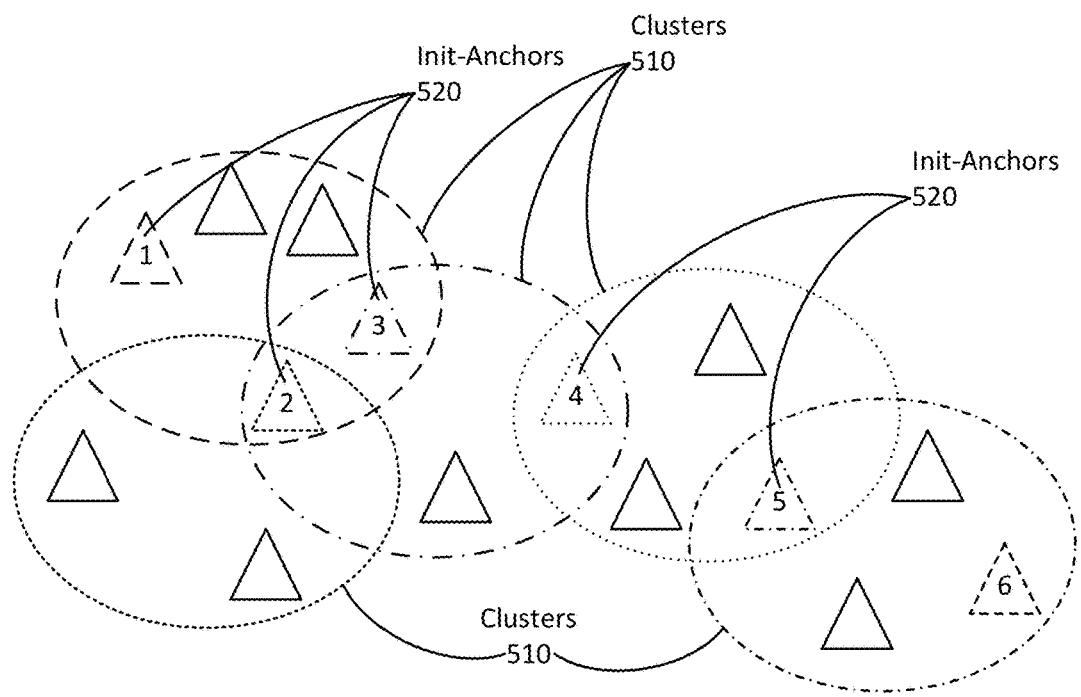
FIG. 5A is a simplified diagram of an example multi-cluster anchor network comprising multiple clusters, according to an embodiment.

FIG. 5A is a simplified diagram of an example multi-cluster UWB anchor network comprising multiple clusters 510. In this example, each cluster has a corresponding Init-Anchor 520 that may coordinate positioning sessions within the respective cluster 510. In FIGS. 5, Init-Anchors are labeled 1-5, and Init-Anchors 520 and clusters 510 having the same dashed line pattern indicate the Init-Anchor 520 for the corresponding cluster 510. Unlabeled triangles represent other anchors (e.g., responder anchors) in a cluster 510.

In a multi-cluster UWB anchor network, there may be a certain Init-Anchor 520 that is designated as the Global-Anchor. The Global-Anchor may comprise an Init-Anchor that provides a common time reference to the entire UWB anchor network. This can help enable positioning of a tag or device that moves from one cluster 510 to another and reduce errors that may be related to multi-hop synchronization. The Global-Anchor can also provide control information to help reduce inter-cluster RF collisions. For example, in instances in which clusters are synchronized in time and conducting positioning sessions in parallel, the Global-Anchor may a locate different clusters 510 to different rounds of a ranging block. In this manner, each cluster 510 may be given a separate round (e.g., cluster 1 may communicate during round 1, cluster 2 may communicate during round 2, etc.) to help reduce RF interference.

Because clusters overlap, inter-cluster communication may occur by leveraging the ranging control phase of a round. (E.g., slot #1 430/ranging control phase 440 of round #1 420, as illustrated in FIG. 4.) For example, communication between the cluster of Init-Anchor 1 (in FIG. 5A) and the clusters of Init-Anchor 2 and Init-Anchor 3 may occur during the control phase of the round allocated for the cluster of Init-Anchor 1, when Init-Anchor 1 communicates control information (e.g., timing synchronization, round allocation, and/or other information). Because Init-Anchor 2 and Init-Anchor 3 are in the cluster of Init-Anchor 1, they receive this information during the control phase of the round allocated for the cluster of Init-Anchor 1. They can then communicate this information in the control phase of their respective clusters.

Figure 5B:
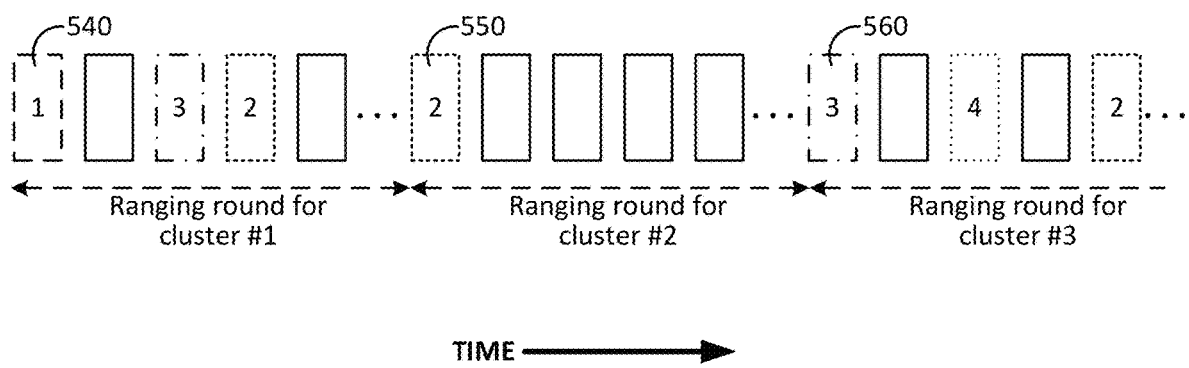
FIG. 5B is a timing diagram of ranging rounds that may be used in the multi-cluster anchor network of FIG. 5A, according to an embodiment.

An example of this is illustrated in FIG. 5B. In ranging round for cluster #1, Init-Anchor 1 communicates control phase information in a first slot 540. Because Init-Anchors 2 and 3 are in cluster #1 they receive this information. They can then propagate this information to the respective clusters. Init-Anchor 2 relays this information in a first slot 550 of the ranging round for cluster #2, and Init-Anchor 3 relays this information in a first slot 560 of the ranging round for cluster #3. Because Init-Anchor 4 is in cluster 3, it can then propagate this information to its cluster (cluster 4).

In this example, in Init-Anchor 1 may comprise the Global-Anchor, and may therefore be allocated the first round in a ranging block. By allocating the first ranging round to the cluster of the Global-Anchor, it can allow information to propagate "downstream" from the Global-Anchor to other Init-Anchors in the network (e.g., from Init-Anchor 1 to Init-Anchor 5) relatively quickly, within a single ranging block. However, "upstream" communications from other clusters toward the Global-Anchor (e.g., from Init-Anchor 5 to Init-Anchor 1) may take a relatively long time, spanning multiple ranging blocks.

To address coordination of signaling among the various clusters 510 of a multi-cluster UWB anchor network e.g., by a Global-Anchor) different proposals have been made to enable signaling among different clusters 510 by expanding the control phase beyond the single-slot ranging control phase traditionally included in each round (e.g., the first slot 430 in a round 420, as illustrated in FIG. 4).

Figure 6A:
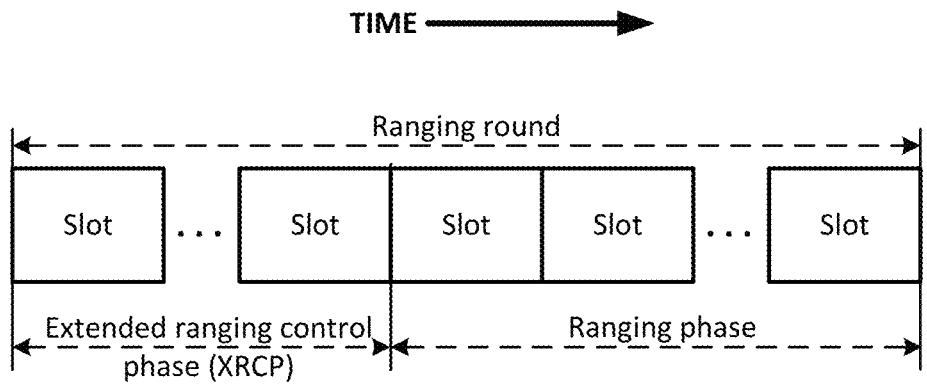
FIG. 6A illustrates a modified ranging round according to a first proposal for an expanded control phase for UWB networking

FIG. 6A illustrates a modified ranging round according to a first proposal for an expanded control phase for UWB networking. In this proposal, rather than having a single slot for control phase (e.g., ranging control phase 440 illustrated in FIG. 4), a ranging round includes an extended ranging control phase (XRCP) spanning multiple slots. Within the XRCP, slots may be allocated to multiple Init-Anchors within the UWB network for communication.

Figure 6B:
FIG. 6B illustrates a second proposal for an expanded control phase for UWB networking.

FIG. 6B illustrates a second proposal for an expanded control phase for UWB networking. In this proposal, a beacon only period (BOP) is a time period in which Init-Anchors can communicate to coordinate positioning within the ranging block. For TDOA, for example, information exchanged during the BOP may include information related to synchronization, TDOA parameters, round duration, etc. The BOP may exist in a "super frame" timing structure for communication and positioning by the UWB network, separate from the ranging rounds and even (as illustrated) outside the ranging block. Similar to the XRCP, the BOP may include a series of slots allocated to the various Init-Anchors within the network.

Problematically, proposals for an expanded control phase such as the XRCP and BOP in which slots are allocated among multiple Init-Anchors often do not have a clear slot allocation scheme. This may result in un-standardized implementations that may be limited in efficiency and scalability. Embodiments herein address these and other issues by providing for slot scheduling that allocates slots of a control phase among Init-Anchors of a UWB network in an efficient manner that is scalable and may adapt to additional anchors and clusters. The slot scheduling may be performed, for example, by a Global-Anchor.

For synchronization in a UWB anchor network, a cost metric (CM) can be calculated to determine "a degree of proximity to the anchor providing a common time base to establish a synchronization hierarchy or tree within a multi-cluster deployment." Put differently, the CM for a given anchor may be considered the number of hops between the Global-Anchor and given anchor. Because each hop can introduce a timing error, anchors having a lower CM are subject to fewer timing errors in synchronization messages, leading to higher positioning accuracy. Thus, according to some embodiments, the Init-Anchor resulting in the lowest average CM across all anchors in the network may be selected as the Global-Anchor for the network. To enable the designation of the Global-Anchor, and to allow for the selection of a new Global-Anchor when the new Init-Anchors join the network, Init-Anchors can calculate and share their CM values.

In some embodiments, additional criteria may be considered to enhance the basic CM description previously described. These criteria may be used, for example, along with the CM to determine a centrality metric value that can be used to select the Global-Anchor and as described in more detail hereafter, can be used for slot scheduling of a control phase. Some criteria that can be used to select the Global-anchor and/or the Init-anchor with a cluster may include:

Access to a global time source (such as UTC) with superior clock stability. anchors with access to a source with clock stability may be favored those without such a source. Such sources may comprise 5G-NR base station or a GNSS source, for example. Relatedly, the quality (e.g., SNR) of the received timing signal from the source by the anchor may be a factor.

Clock stability of the anchor. With regard to this factor, anchors with better clock stability would be favored over those with poorer clock stability.

Ground truth accuracy. Because timing of other anchors relative to an anchor may be impacted by a distance of the other anchors to the anchor, an accurate knowledge of the location of the anchor can help ensure reduce/minimize location-related timing errors. Thus, an anchor with greater ground truth accuracy may be more favorable than one with poorer ground accuracy as a global-anchor/Init-anchor.

Geographic location. An anchor with maximal coverage of the region maybe favorable. For example, an anchor that is closest to the center of the region served by a cluster may be selected as the Init-anchor, and/or the anchor that is closest to the center of the network may be selected as the global-anchor. Alternatively, location can be considered among other factors. Graph-theory analysis can also be used (as described hereafter).

Prevalence of LoS links and high-quality ToA estimation. As an example, an anchor that is at the ceiling (provided, for example, the geometry of the environment is known a-priori) may be preferable to one located elsewhere, given that it is more likely to have larger number of LoS links to other anchors. Relatedly, according to some embodiments, RSRP of the signals received from an anchor also may be a key metric.

Power consumption information. Whether an anchor is battery-powered or connected to a stable power supply can be a factor. An anchor connected to a stable power supply may be preferable over one powered by a battery or unstable power source.

As previously noted, a centrality metric value for an Init-Anchor may be determined from a CM and (optionally) one or more of the above criteria. For example, according to some embodiments, graph-theory principles may be used to calculate a weighted-closeness centrality (CC) to indicate how close an Init-Anchor is to the other Init-Anchors in the network. It may be calculated as the average of the shortest path length from the node to every other node in the network, as follows:

$$C_x = \frac{N}{\sum_y w_y d_{x,y}}$$

where $d_{x,y}$ is the distance or number of hops between Init-Anchors x and y, and N is the total number of Init-Anchors. The parameter/weight $w_y$ indicates a quality of the link and/or anchor for achieving synchronization, related to previously-described criteria. In other words, parameter/weight $w_y$ can be seen as a value representing one or more of the criteria. Setting this value to 1 would be an alternative way for determining the CM.

As noted, embodiments may utilize centrality metric values (such as the CC or CM) to determine a slots schedule for a control phase. In particular, a Global-Anchor can allocate slots within a slot schedule such that the slot schedule includes upstream slots (slots enabling upstream communication) followed by downstream slots (slots enabling downstream communication) to help facilitate efficient communication among the Init-Anchors of a UWB anchor network. The example illustrated in FIG. 7A-8B helps illustrate some of the benefits of this slot schedule structure.

Figure 7A:
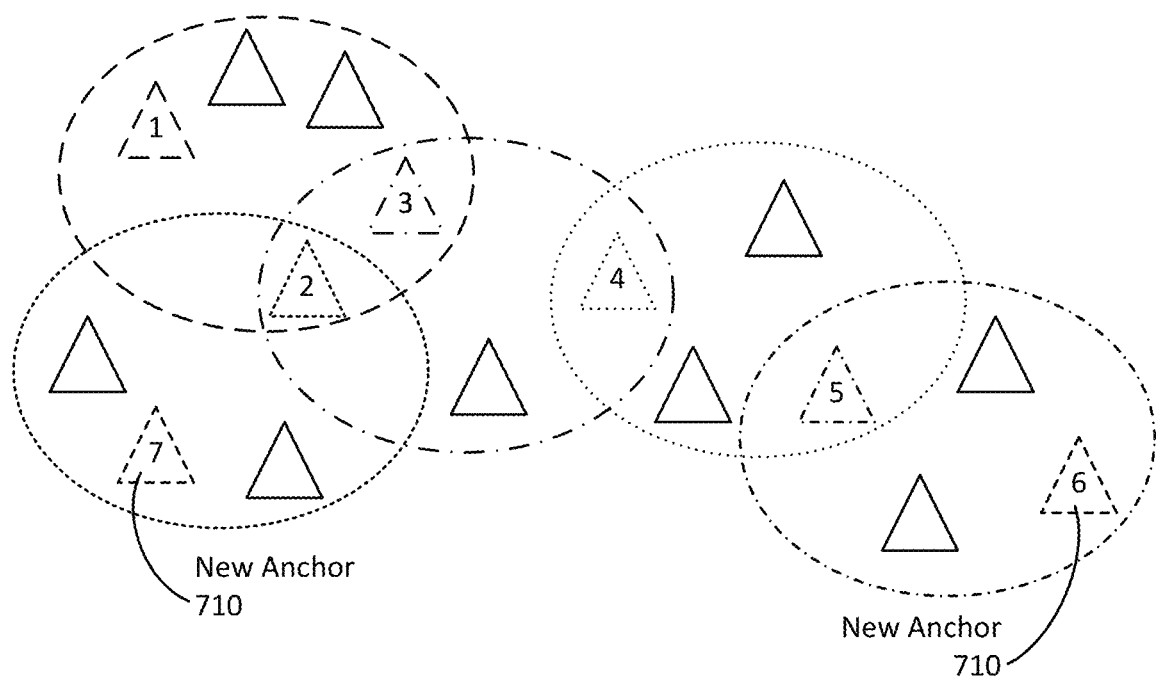
FIG. 7A is an illustration of the example network shown in FIG. 5A in which new initiator anchors (Init-Anchors) are joining the network.
Figure 7B:
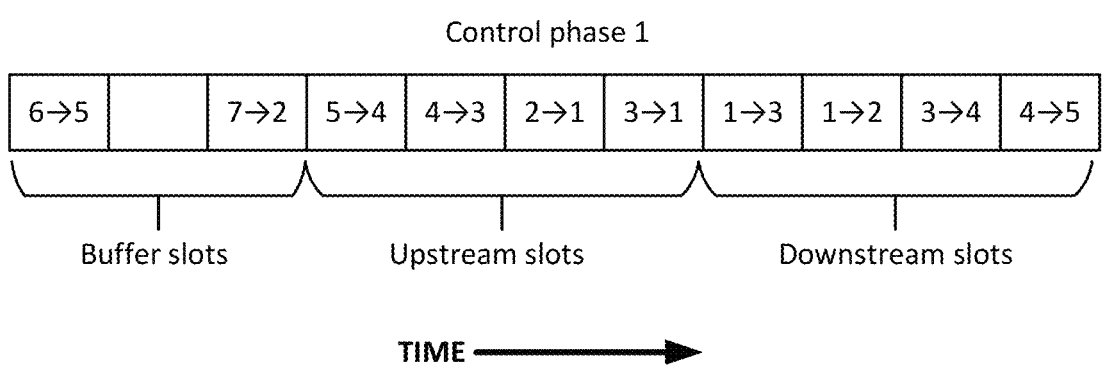
FIG. 7B is an illustration of control phase 1, a first control phase corresponding to the network of FIG. 7A, according to an embodiment.

FIG. 7A is an illustration of the network shown in FIG. 5A in which new anchors 710 (Init-Anchor 6 and Init-Anchor 7) are joining the network. FIG. 7B is an illustration of control phase 1, a first control phase corresponding to the network of FIG. 7A at the time the new anchors 710 are joining. Additionally, at the time of the first control phase, Init-Anchor 1 is the Global-Anchor of the network. As previously noted, a Global-Anchor (in this case, Init-Anchor 1) may schedule upstream slots (slots for upstream communication) followed by downstream slots, enabling an efficient usage of the control phase slots. Additionally, as illustrated, buffer slots (unallocated slots for new Init-Anchors to use to join the network), may precede the upstream slots in the control phase.

The efficiency of this slot scheduling of control phase 1 can be seen when describing the process of adding new anchors 710. As illustrated, new anchors 710 (Init-Anchor 6 and Init-Anchor 7) utilize the buffer slots at the beginning of control phase 1 to indicate the presence and request to be added to the network. (It can be noted that, because Init-Anchor 6 and Init-Anchor 7 are Init-Anchors, each may have a respective cluster of anchors, which is not shown in FIG. 7A.) Specifically, Init-Anchor 6 communicates to Init-Anchor 5, and Init-Anchor 7 communicates to Init-Anchor 2. Because the addition of new anchors 710 may impact the centrality metric values for Init-Anchors in the network, potentially leading to the designation of a new Global-Anchor, the information provided by Init-Anchor 6 and Init-Anchor 7 may include centrality metric values (e.g., CM and/or CC values). Because the buffer slots precede the upstream slots, the other Init-Anchors can pass the centrality metric values of the new anchors 710 upstream, as well as recalculate and send their own (updated) centrality metric values.

By the end of the upstream slots in control phase 1, the current Global-Anchor (Init-Anchor 1) has the centrality metric values of all the Init-Anchors and can respond accordingly. The Global-Anchor may then send new information to the Init-Anchors of the UWB network in downstream communication (relayed during the downstream slots). This information can include, for example, an acknowledgment (ACK) by the Global-Anchor of the receipt of the updated centrality metric values. It can also include a new slot schedule for a subsequent control phase (control phase 2) in which Init-Anchor 6 and Init-Anchor 7 are each allocated upstream and downstream slots. Further, if the current Global-Anchor (Init-Anchor 1) determines a new Global-Anchor based on the updated centrality metric values, it can communicate the designation of the new Global-Anchor. In some embodiments, as described in further detail hereafter, the current Global-Anchor may first send a message to the new Global-Anchor (e.g., via downstream slots) and await and ACK (e.g., via upstream slots in a subsequent control phase) before designated the new Global-Anchor. Further, in some embodiments, if the current Global-Anchor determines a new Global-Anchor, the current Global-Anchor may include an update flag in downstream communication indicating that a new Global-Anchor will be designated (e.g., pending and ACK from the new Global-Anchor).

To enable upstream and downstream communication, the Global-Anchor may determine the slot schedule based on centrality metric values. Specifically, upstream slots may be scheduled in order of decreasing centrality metric values, and upstream slots may be scheduled in order of increasing centrality metric values. In this manner, the Global-Anchor can ensure that upstream slots are scheduled in a way that enables communication from Init-Anchors at or near the edge of the UWB network to the Global-Anchor and downstream slots are scheduled in a way that enables communication from the Global-Anchor to the Init-Anchors at or near the edge of the UWB network.

Embodiments may implement additional features to account for different scenarios. For example, in case of packet loss, there may be additional opportunities to propagate information during the ranging control phase (e.g., ranging control phase 440 of FIG. 4). The ranging control phase can also be used to provide information to new Init-Anchors. For instance, in the example of FIGS. 7A and 7B, the new control phase slot schedule provided by the Global-Anchor to the other Init-Anchors in the downstream communication performed in the downstream slots may be relayed to the new Init-Anchors 710 during the ranging control phase. Specifically, Init-Anchor 2 can utilize the ranging control phase in the round for its cluster to communicate the new control phase slot schedule to Init-Anchor 7, and Init-Anchor 5 can utilize the ranging control phase in the round for its cluster to communicate the new control phase slot schedule to Init-Anchor 6. Additionally or alternatively, the new slot schedule for the control phase may also simply be relayed via OOB communications.

Figure 8A:
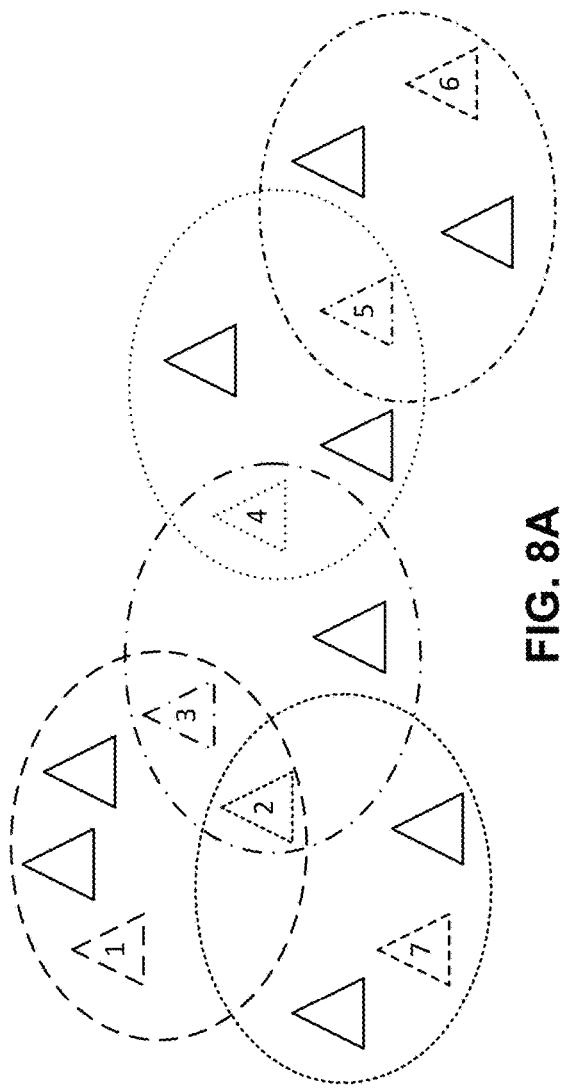
FIG. 8A illustrates the UWB network of FIG. 7A after new Init-Anchors have been added.
Figure 8B:
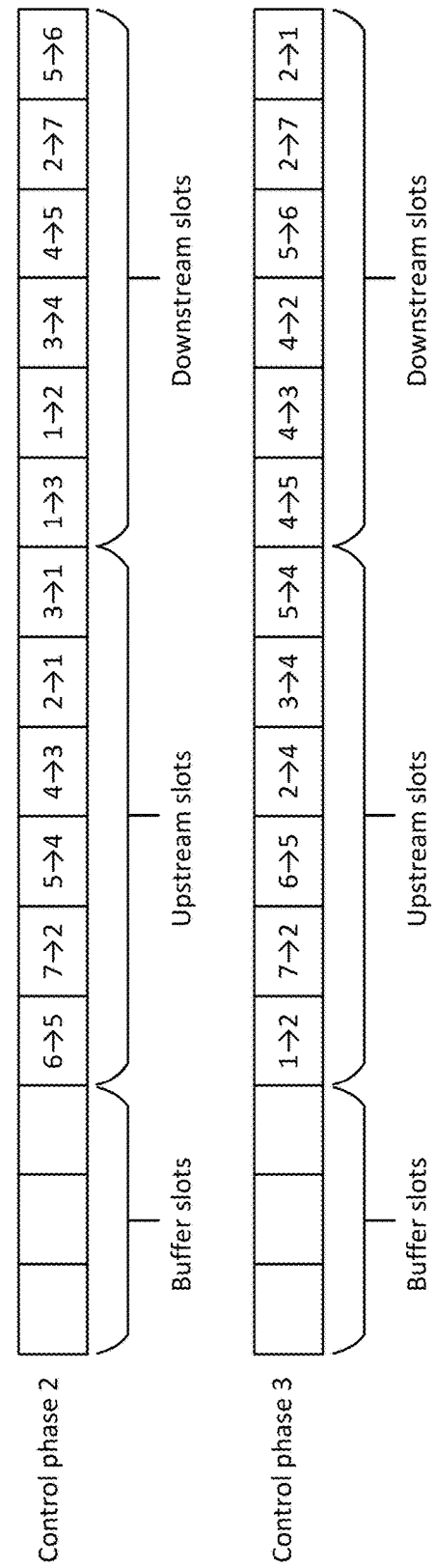
FIG. 8B illustrates example control phase 2 and control phase 3 that follow control phase 1 of FIG. 7B, according to an embodiment.

FIG. 8A illustrates the UWB network after Init-Anchor 6 and Init-Anchor 7 have been added, and FIG. 8B illustrates control phase 2 and control phase 3 that follow control phase 1 of FIG. 7B. As shown in control phase 2, upstream and downstream slots now include allocated slots for Init-Anchor 6 and Init-Anchor 7.

Control phase 3 illustrates an example control phase, following control phase 2, in which a new Global-Anchor is selected. Again, the selection of the new Global-Anchor maybe based on the new centrality metric values Init-Anchors from the addition of Init-Anchor 6 and Init-Anchor 7 in control phase 1. In this example, the current Global-Anchor (Init-Anchor 1) determines in control phase 1 that Init-Anchor 4 is to be the new Global-Anchor. Accordingly, Init-Anchor 1 may send a request to Init-Anchor 4 in the downstream communication of control phase 1 for Init-Anchor 4 to become the new Global-Anchor. The upstream communication in upstream slots of control phase 2 may carry and ACK from Init-Anchor 4 back to Init-Anchor 1, acknowledging that Init-Anchor 4 will become the new Global-Anchor. Init-Anchor 1 (as the current Global-Anchor) can then send a new slot schedule in the downstream communication conveyed by downstream slots of control phase 2, in which the new slot schedule reflects Init-Anchor 4 as the new Global-Anchor. In this manner, Init-Anchor 1 can complete a three-way handshake with Init-Anchor 4 for designating Init-Anchor 4 as the new Global-Anchor (comprising the request, ACK, and subsequent designation). Control phase 3 then implements this new slot schedule (communicated in the downstream slots of control phase 2). In control phase 3, the various Init-Anchors may continue to deliver centrality metric values, which get provided to the new Global-Anchor (Init-Anchor 4), and the new Global-Anchor can specify a slot schedule for the subsequent control phase accordingly.

Figure 9:
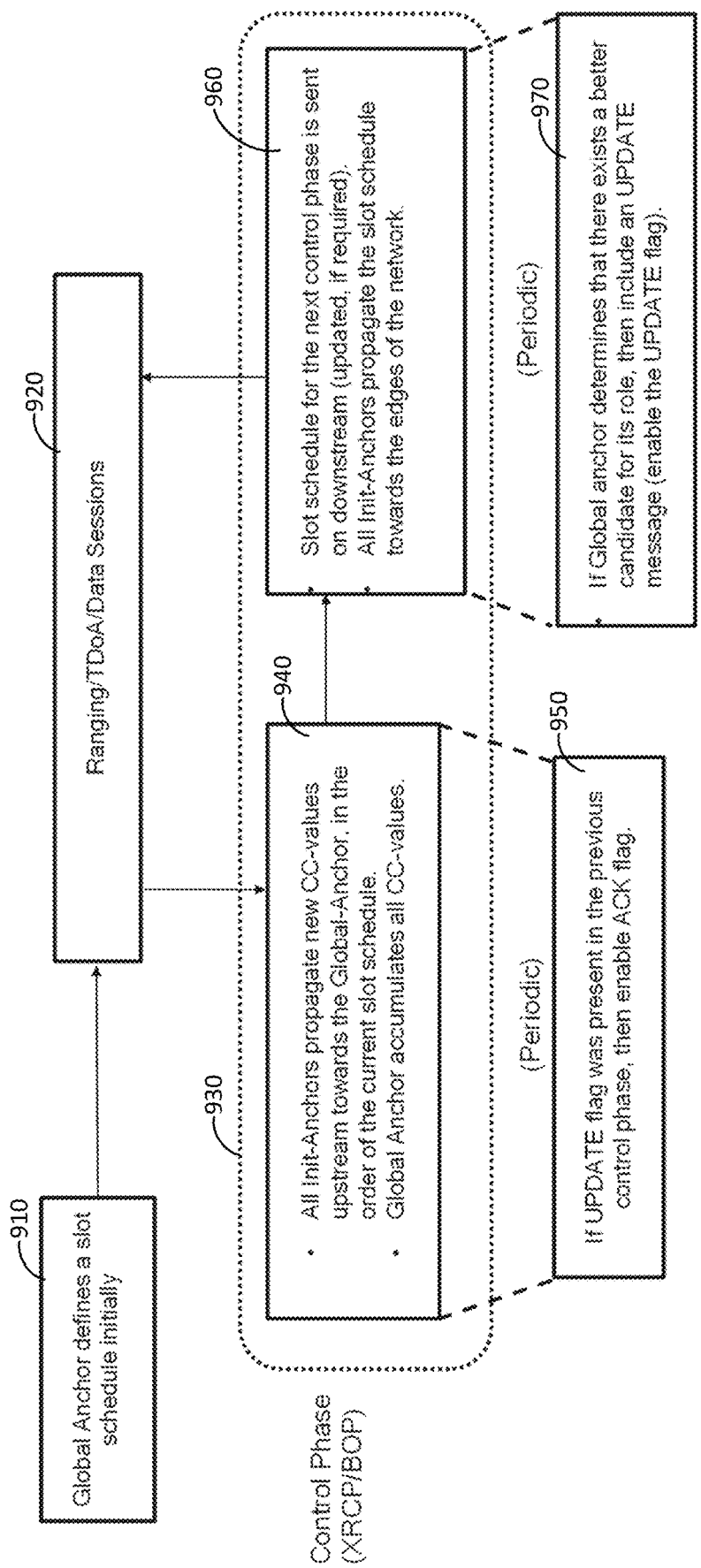
FIG. 9 is a flow diagram illustrating a process of determining and updating a control phase slot schedule, according to an embodiment.

FIG. 9 is a flow diagram illustrating a process of determining and updating a control phase slot schedule, according to an embodiment. The operations illustrated in the flow diagram may be executed by anchors in a UWB anchor network, particularly Init-Anchors in a multi-cluster UWB anchor network. The flow may begin with the functionality of block 910, in which the Global-Anchor defines an initial slot schedule. The determination of the Global-Anchor and the initial slot schedule may be governed by rules that may be established within and applicable standard. Otherwise, different techniques for determining a Global-Anchor and/or initial slot schedule may be implemented, depending on desired functionality. In some embodiments, a Global-Anchor may create the initial slot schedule by randomly allocating slots among the various Init-Anchors in the network. The network may then perform ranging/TDOA/data sessions, as indicated at block 920.

The process may then move to the control phase 930 which, as indicated in FIG. 9 and previously indicated, may comprise an XRCP or BOP. At block 940 upstream communication occurs in which the Init-Anchors provide updated CC (or other centrality metric) values upstream toward the Global-Anchor, in accordance with the current slot schedule. Further, as noted at block 950, if Init-Anchors received an UPDATE flag was in the previous control phase, then they may respond with an ACK in the upstream communication.

Block 960 represents the downstream communication from the Global-Anchor. Here, as previously indicated, the Global-Anchor can set the schedule for the next control phase, in view of the CC (or other centrality metric) values received from the Init-Anchors in the upstream communications at block 940. Additionally, as indicated at block 970, if the Global-Anchor identifies a new Global-Anchor, it may include an UPDATE flag, indicating a possible new Global-Anchor. (As indicated in the above-described embodiments, if the current Global-Anchor receives an ACK from the proposed new Global-Anchor, it can then designate the new-global-Anchor and determine a corresponding slot schedule in the subsequent control phase. As indicated in FIG. 9, some embodiments may employ the functionality at blocks 950 and/or 970 periodically. In particular, according to some embodiments, an existing Global-Anchor may check to see whether return designate a new Global-Anchor periodically (e.g., every hour, day, week, month, etc.), rather than during every control phase of the network.

Although not illustrated in FIG. 9, additional functionality may be included to allow for the addition of new Init-Anchors. Prior to the upstream communication functionality at block 940, for example, the control phase may include a set of buffer slots during which prospective new Init-Anchors may communicate a request to existing Init-Anchors to join the network. (According to some embodiments, the prospective new Init-Anchors may select slots randomly in which to communicate.) This request can be passed along with the other upstream information at block 940. In such instances, as previously discussed, the downstream communications that block 960 may include a new schedule for a subsequent control phase that includes slot allocations for the new Init-Anchors.

Figure 10:
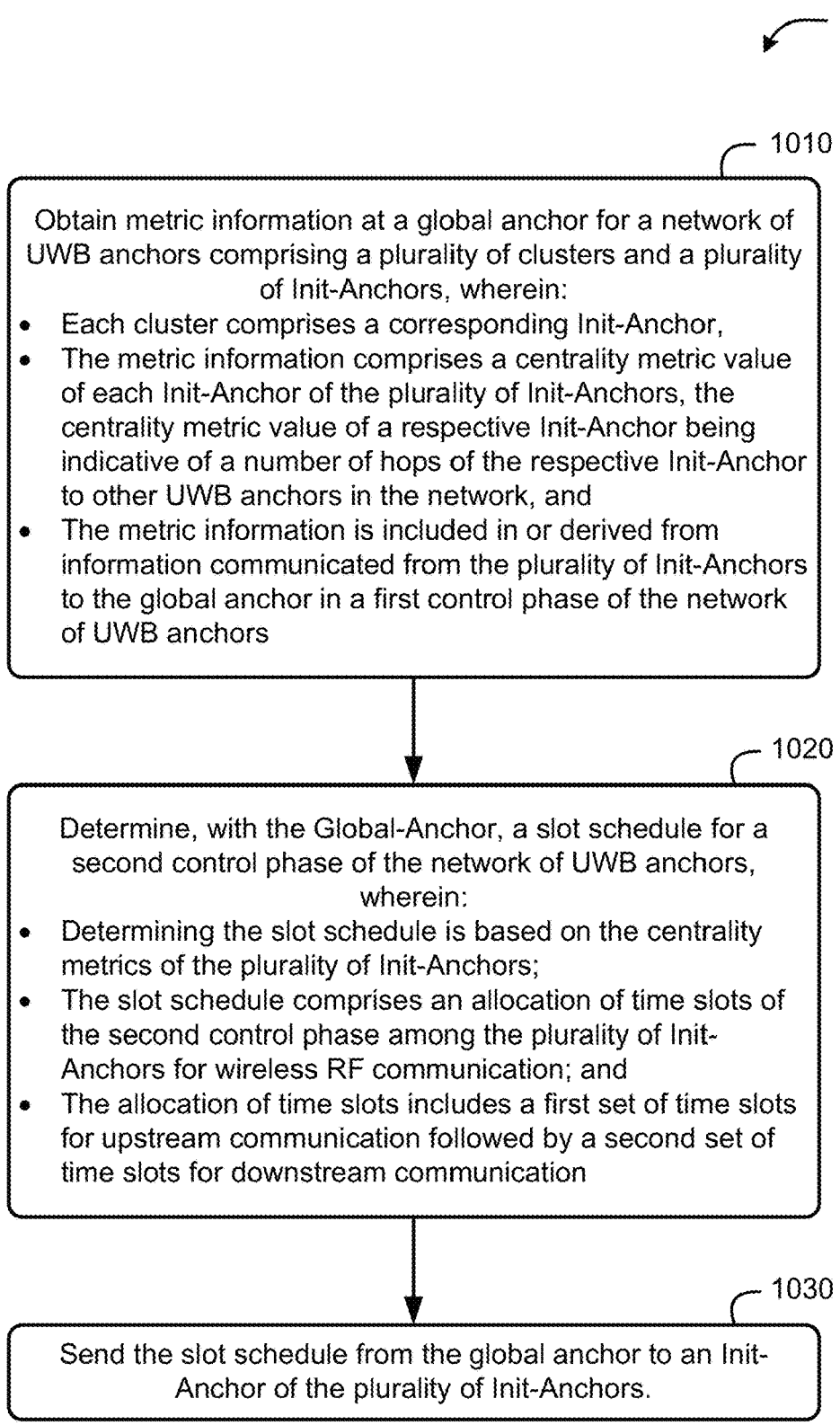
FIG. 10 is a flow diagram of a method for inter-cluster coordination in UWB positioning, according to an embodiment.

FIG. 10 is a flow diagram of a method 1000 for inter-cluster coordination in UWB positioning, according to an embodiment. Aspects of the method 1000 may reflect the functionality of a Global-Anchor as described in embodiments detailed elsewhere herein. Means for performing the functionality illustrated in one or more of the blocks shown in FIG. 10 may be performed by hardware and/or software components of a UWB device. In particular, a UWB device acting as a Global-Anchor of a multi-cluster UWB network. Example components of such UWB devices are illustrated in FIGS. 11 and 12 which is described in more detail hereafter.

At block 1010, the functionality comprises obtaining metric information at a global anchor for a network of UWB anchors comprising a plurality of clusters and a plurality of Init-Anchors, wherein: each cluster comprises a corresponding Init-Anchor, the metric information comprises a centrality metric value of each Init-Anchor of the plurality of Init-Anchors, the centrality metric value of a respective Init-Anchor being indicative of a number of hops of the respective Init-Anchor to other UWB anchors in the network, and the metric information is included in or derived from information communicated from the plurality of Init-Anchors to the Global-Anchor in a first control phase of the network of UWB anchors. As previously described, a Global-Anchor may obtain metric information from upstream communication by Init-Anchors in the first control phase. Further, as previously described, the centrality metric value for each Init-Anchor may comprise a CM value or CC value, for example, indicative of the number of hops of the respective Init-Anchors from other UWB anchors in the network.

Figure 11:
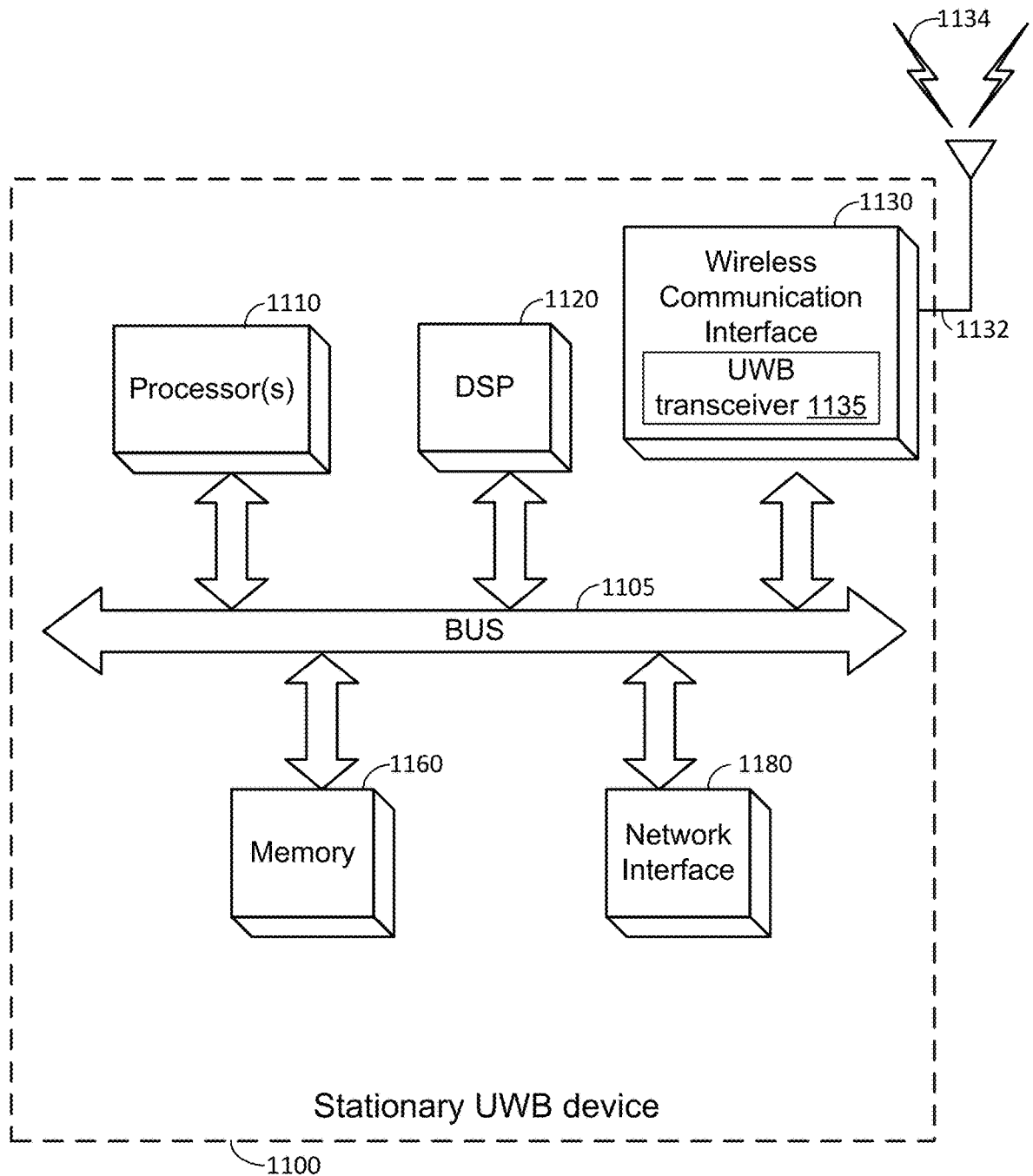
FIG. 11 is a block diagram of an embodiment of a stationary UWB device, which can be utilized as described herein.
Figure 12:
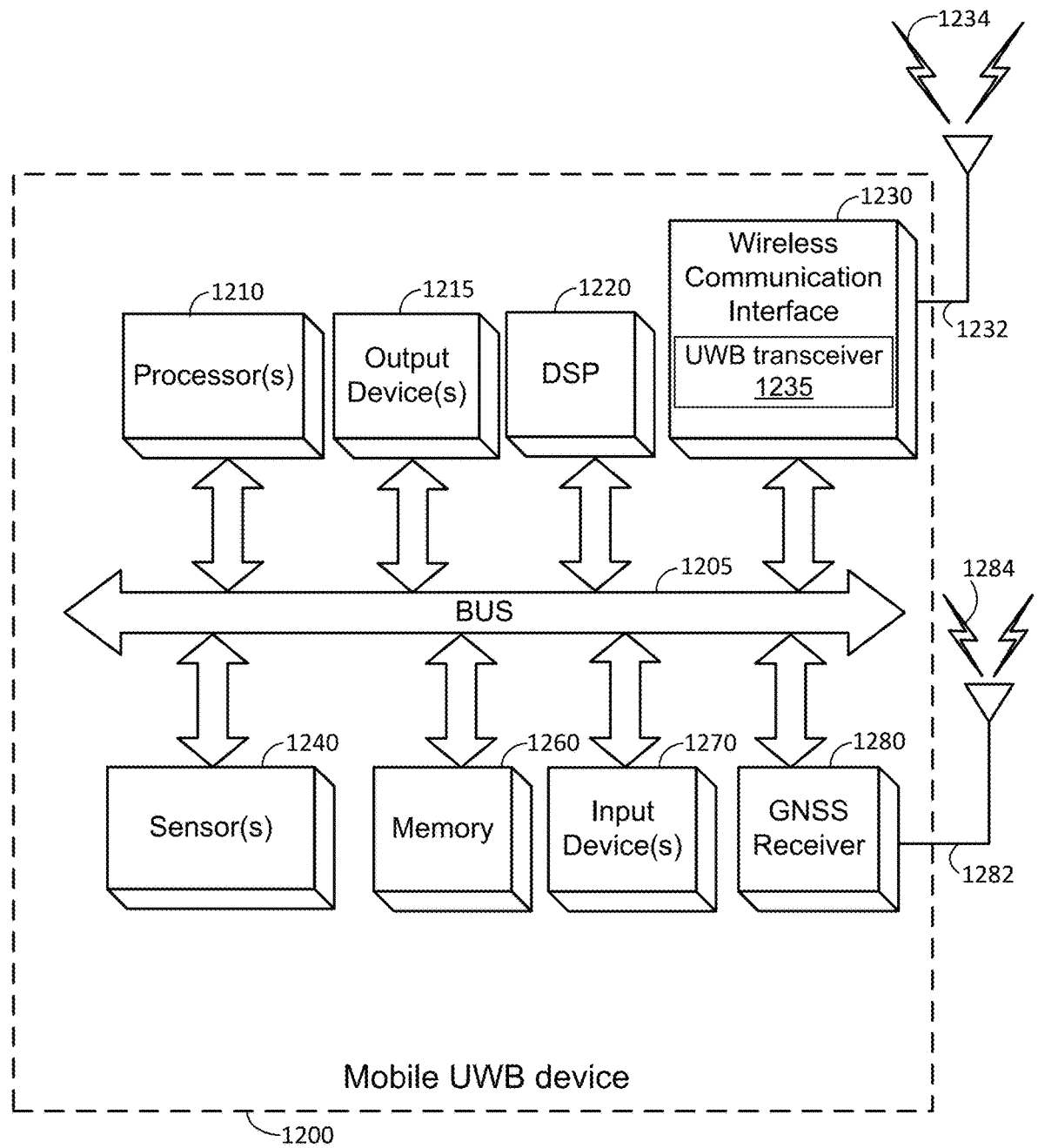
FIG. 12 is a block diagram of an embodiment of a mobile UWB device, which can be utilized as described herein.

In some embodiments, for performing functionality at block 1010 may comprise a bus 1105, processor(s) 1110, memory 1160, wireless communication interface 1130 (including optional UWB transceiver 1135), and/or other components of a stationary UWB device 1100 as illustrated in FIG. 11 and described hereafter. In some embodiments, means for performing functionality at block 1010 may comprise a bus 1205, processor(s) 1210, memory 1260, wireless communication interface 1230 (including optional UWB transceiver 1235), and/or other components of a mobile UWB device 1200 as illustrated in FIG. 12 and described hereafter.

At block 1020, the functionality comprises determining, with the Global-Anchor, a slot schedule for a second control phase of the network of UWB anchors, wherein: determining the slot schedule is based on the centrality metrics of the plurality of Init-Anchors; the slot schedule comprises an allocation of time slots of the second control phase among the plurality of Init-Anchors for wireless RF communication; and the allocation of time slots includes a first set of time slots for upstream communication followed by a second set of time slots for downstream communication.

As noted in the embodiments described herein, upstream and downstream communications can be determined using the centrality metric values of the Init-Anchors. According to some embodiments, the Global-Anchor allocates the time slots of the first set of time slots among the plurality of Init-Anchors in order of decreasing centrality metric values. Additionally or alternatively, the Global-Anchor allocates the time slots of the second set of time slots among the plurality of Init-Anchors in order of increasing centrality metric values. The use of buffer timeslots can also be employed to allow for new Init-Anchors. As such, according to some embodiments of the method 1000, the Global-Anchor may further include, in the slot schedule, a set of buffer time slots in which new Init-Anchors can communicate to join the network of UWB anchors. In such embodiments, the set of buffer time slots may precede the first set of time slots.

In some embodiments, for performing functionality at block 1020 may comprise a bus 1105, processor(s) 1110, memory 1160, wireless communication interface 1130 (including optional UWB transceiver 1135), and/or other components of a stationary UWB device 1100 as illustrated in FIG. 11 and described hereafter. In some embodiments, means for performing functionality at block 1020 may comprise a bus 1205, processor(s) 1210, memory 1260, wireless communication interface 1230 (including optional UWB transceiver 1235), and/or other components of a mobile UWB device 1200 as illustrated in FIG. 12 and described hereafter.

At block 1030, the functionality comprises sending the slot schedule from the global anchor to an Init-Anchor of the plurality of Init-Anchors. As noted, according to some embodiments, the Global-Anchor May sent the slot schedule to the Init-Anchor of the plurality of Init-Anchors during a time slot in a set of time slots in the first control phase allocated for downstream communications.

In some embodiments, for performing functionality at block 1030 may comprise a bus 1105, processor(s) 1110, memory 1160, wireless communication interface 1130 (including optional UWB transceiver 1135), and/or other components of a stationary UWB device 1100 as illustrated in FIG. 11 and described hereafter. In some embodiments, means for performing functionality at block 1030 may comprise a bus 1205, processor(s) 1210, memory 1260, wireless communication interface 1230 (including optional UWB transceiver 1235), and/or other components of a mobile UWB device 1200 as illustrated in FIG. 12 and described hereafter.

Depending on desired functionality, embodiments of the method 1000 may include one or more additional operations. For example, according to some embodiments, responsive to at least one new Init-Anchor communicating in a buffer time slot of the first control phase to join the network of UWB anchors, the Global-Anchor may allocate at least one time slot in the slot schedule to one new Init-Anchor. According to some embodiments, the Global-Anchor may further determine a prospective new Global-Anchor is based on the centrality metrics of the plurality of Init-Anchors. In such embodiments, the Global-Anchor a further send a message to the prospective new Global-Anchor via downstream communication in the first control phase, receive an acknowledgement (ACK) from the prospective new Global-Anchor during the upstream communication of the second control phase, and determine a slot schedule for a third control phase, subsequent to the second control phase, wherein the downstream and upstream communication allocated in slot schedule for the third control phase considers the prospective new Global-Anchor as the new Global-Anchor for the network of UWB anchors. According to some embodiments, the first control phase, the second control phase, or both, comprise XRCP or BOP, or a combination thereof.

FIG. 11 is a block diagram of an embodiment of a stationary UWB device 1100, which can be utilized as described herein. It should be noted that FIG. 11 is meant only to provide a generalized illustration of various components, any or all of which may be utilized as appropriate. In some embodiments, the stationary UWB device 1100 may correspond to a UWB anchor (including an Init-Anchor and/or Global-Anchor) having a known location, which may be used to determine the location of other UWB devices, including mobile UWB devices. According to some embodiments, the stationary UWB device 1100 may be permanently stationary or temporarily stationary.

The stationary UWB device 1100 is shown comprising hardware elements that can be electrically coupled via a bus 1105 (or may otherwise be in communication, as appropriate). The hardware elements may include a processor(s) 1110 which can include without limitation one or more general-purpose processors, one or more special-purpose processors (such as DSP chips, graphics acceleration processors, ASICs, and/or the like), and/or other processing structure or means. As shown in FIG. 11, some embodiments may have a separate DSP 1120, depending on desired functionality. Location determination and/or other determinations based on wireless communication may be provided in the processor(s) 1110 and/or wireless communication interface 1130 (discussed below), according to some embodiments. The stationary UWB device 1100 also can include one or more input devices, which can include without limitation a keyboard, display, mouse, microphone, button(s), dial(s), switch(es), and/or the like; and one or more output devices, which can include without limitation a display, light emitting diode (LED), speakers, and/or the like.

The stationary UWB device 1100 might also include a wireless communication interface 1130, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, cellular communication facilities, etc.), and/or the like, which may enable the stationary UWB device 1100 to communicate as described herein. The wireless communication interface 1130 may permit data and signaling to be communicated (e.g., transmitted and received) to mobile devices, wireless network nodes (e.g., base stations, access points, etc.), and/or other network components, computer systems, and/or any other electronic devices described herein. The communication can be carried out via one or more wireless communication antenna(s) 1132 that send and/or receive wireless signals 1134.

As illustrated, the wireless indication interface 1130 may further comprise a UWB transceiver 1135. The UWB transceiver 1135 may be operated to perform the UWB operations described herein. Further, the wireless communications interface 1130 may comprise one or more additional communication technologies with which any OOB functionalities described herein may be performed. According to some embodiments, the UWB transceiver 1135 may be one of a plurality of UWB transceivers of the mobile UWB device 1100. Further, the UWB transceiver may be used for functionality in addition to the UWB positioning functionality described herein. Although illustrated as part of the wireless communication interface 1130, the UWB transceiver 1135 may be separate from the wireless communication interface 1130 in some embodiments.

The stationary UWB device 1100 may also include a network interface 1180, which can include support of wireline communication technologies. The network interface 1180 may include a modem, network card, chipset, and/or the like. The network interface 1180 may include one or more input and/or output communication interfaces to permit data to be exchanged with a network, communication network servers, computer systems, and/or any other electronic devices described herein. In some embodiments, the stationary UWB device 1100 may be communicatively coupled with one or more servers and/or other stationary UWB devices via the network interface 1180.

In many embodiments, the stationary UWB device 1100 may further comprise a memory 1160. The memory 1160 can include, without limitation, local and/or network accessible storage, a disk drive, a drive array, an optical storage device, a solid-state storage device, such as a RAM, and/or a ROM, which can be programmable, flash-updateable, and/or the like. Such storage devices may be configured to implement any appropriate data stores, including without limitation, various file systems, database structures, and/or the like.

The memory 1160 of the stationary UWB device 1100 also may comprise software elements (not shown in FIG. 11), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1160 that are executable by the stationary UWB device 1100 (and/or processor(s) 1110 or DSP 1120 within stationary UWB device 1100). In some embodiments, then, such code and/or instructions can be used to configure and/or adapt a general-purpose computer (or other device) to perform one or more operations in accordance with the described methods.

FIG. 12 is a block diagram of an embodiment of a mobile UWB device 1200, which can be utilized as described herein, e.g., as a tag or mobile device to be positioned and/or as a UWB anchor (including an Init-Anchor and/or Global-Anchor). It should be noted that FIG. 12 is meant only to provide a generalized illustration of various components, any or all of which may be utilized as appropriate. For example, more basic/simple types of UWB devices may omit various components that may be included in more advanced/complex UWB devices. Furthermore, as previously noted, the functionality of the mobile device or UE discussed in the previously described embodiments may be executed by one or more of the hardware and/or software components illustrated in FIG. 12.

The mobile UWB device 1200 is shown comprising hardware elements that can be electrically coupled via a bus 1205 (or may otherwise be in communication, as appropriate). The hardware elements may include processor(s) 1210 which can include without limitation one or more general-purpose processors (e.g., an application processor), one or more special-purpose processors (such as digital signal processor (DSP) chips, graphics acceleration processors, application specific integrated circuits (ASICs), and/or the like), and/or other processing structures or means. Processor(s) 1210 may comprise one or more processing units, which may be housed in a single integrated circuit (IC) or multiple ICs. As shown in FIG. 12, some embodiments may have a separate DSP 1220, depending on desired functionality. Location determination and/or other determinations based on wireless communication may be provided in the processor(s) 1210 and/or wireless communication interface 1230 (discussed below). The mobile UWB device 1200 also can include one or more input devices 1270, which can include without limitation one or more keyboards, touch screens, touch pads, microphones, buttons, dials, switches, and/or the like; and one or more output devices 1215, which can include without limitation one or more displays (e.g., touch screens), light emitting diodes (LEDs), speakers, and/or the like.

The mobile UWB device 1200 may also include a wireless communication interface 1230, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the mobile UWB device 1200 to communicate with other devices as described herein. The wireless communication interface 1230 may permit data and signaling to be communicated (e.g., transmitted and received) with access points, various base stations and/or other access node types, and/or other network components, computer systems, and/or any other electronic devices communicatively coupled therewith. The communication can be carried out via one or more wireless communication antenna(s) 1232 that send and/or receive wireless signals 1234. According to some embodiments, the wireless communication antenna(s) 1232 may comprise a plurality of discrete antennas, antenna arrays, or any combination thereof. The antenna(s) 1232 may be capable of transmitting and receiving wireless signals using beams (e.g., Tx beams and Rx beams). Beam formation may be performed using digital and/or analog beam formation techniques, with respective digital and/or analog circuitry. The wireless communication interface 1230 may include such circuitry.

As illustrated, the wireless indication interface 1230 may further comprise a UWB transceiver 1235. The UWB transceiver 1235 may be operated to perform the UWB operations described herein. Further, the wireless communications interface 1230 may comprise one or more additional communication technologies with which any OOB functionalities described herein may be performed. According to some embodiments, the UWB transceiver 1235 may be one of a plurality of UWB transceivers of the mobile UWB device 1200. Further, the UWB transceiver may be used for functionality in addition to the UWB positioning functionality described herein. Although illustrated as part of the wireless communication interface 1230, the UWB transceiver 1235 may be separate from the wireless communication interface 1230 in some embodiments.

Depending on desired functionality, the wireless communication interface 1230 may comprise a separate receiver and transmitter, or any combination of transceivers, transmitters, and/or receivers to communicate with base stations (e.g., ng-eNBs and gNBs) and other terrestrial transceivers, such as wireless devices and access points. The mobile UWB device 1200 may communicate with different data networks that may comprise various network types. For example, a Wireless Wide Area Network (WWAN) may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000®, WCDMA, and so on. CDMA2000® includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. CDMA2000® is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The mobile UWB device 1200 can further include sensor(s) 1240. Sensor(s) 1240 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the mobile UWB device 1200 may also include a Global Navigation Satellite System (GNSS) receiver 1280 capable of receiving signals 1284 from one or more GNSS satellites using an antenna 1282 (which could be the same as antenna 1232). Positioning based on GNSS signal measurement can be utilized to complement and/or incorporate the techniques described herein. The GNSS receiver 1280 can extract a position of the mobile UWB device 1200, using conventional techniques, from GNSS satellites of a GNSS system, such as Global Positioning System (GPS), Galileo, GLONASS, Quasi-Zenith Satellite System (QZSS) over Japan, IRNSS over India, BeiDou Navigation Satellite System (BDS) over China, and/or the like. Moreover, the GNSS receiver 1280 can be used with various+storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1260 of the mobile UWB device 1200 also can comprise software elements (not shown in FIG. 12), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1260 that are executable by the mobile UWB device 1200 (and/or processor(s) 1210 or DSP 1220 within mobile UWB device 1200). In some embodiments, then, such code and/or instructions can be used to configure and/or adapt a general-purpose computer (or other device) to perform one or more operations in accordance with the described methods.

In view of this description embodiments may include different combinations of features. Implementation examples are described in the following numbered clauses:

Clause 1. A method for inter-cluster coordination in ultra-wideband (UWB) positioning, the method comprising: obtaining metric information at a Global-Anchor for a network of UWB anchors comprising a plurality of clusters and a plurality of initiator anchors (Init-Anchors), wherein: each cluster comprises a corresponding Init-Anchor, the metric information comprises a centrality metric value of each Init-Anchor of the plurality of Init-Anchors, the centrality metric value of a respective Init-Anchor being indicative of a number of hops of the respective Init-Anchor to other UWB anchors in the network, and the metric information is included in or derived from information communicated from the plurality of Init-Anchors to the Global-Anchor in a first control phase of the network of UWB anchors; determining, with the Global-Anchor, a slot schedule for a second control phase of the network of UWB anchors, wherein: determining the slot schedule is based on the centrality metric values of the plurality of Init-Anchors; the slot schedule comprises an allocation of time slots of the second control phase among the plurality of Init-Anchors for wireless radio frequency (RF) communication; and the allocation of time slots includes a first set of time slots for upstream communication followed by a second set of time slots for downstream communication; and sending the slot schedule from the Global-Anchor to an Init-Anchor of the plurality of Init-Anchors.

Clause 2. The method of clause 1, wherein the slot schedule is sent to the Init-Anchor of the plurality of Init-Anchors during a time slot in a set of time slots in the first control phase allocated for downstream communications.

Clause 3. The method of any one of clauses 1-2 wherein determining the slot schedule comprises allocating time slots of the first set of time slots among the plurality of Init-Anchors in order of decreasing centrality metric values.

Clause 4. The method of any one of clauses 1-3 wherein determining the slot schedule comprises allocating the time slots of the second set of time slots among the plurality of Init-Anchors in order of increasing centrality metric values.

Clause 5. The method of any one of clauses 1-4 further comprising including, in the slot schedule, a set of buffer time slots in which new Init-Anchors can communicate to join the network of UWB anchors.

Clause 6. The method of clause 5 wherein the set of buffer time slots precedes the first set of time slots.

Clause 7. The method of any one of clauses 1-6 wherein determining the slot schedule comprises allocating at least one time slot in the slot schedule to one new Init-Anchor, responsive to at least one new Init-Anchor communicating in a buffer time slot of the first control phase to join the network of UWB anchors.

Clause 8. The method of any one of clauses 1-7 further comprising determining a prospective new Global-Anchor is based on the centrality metrics of the plurality of Init-Anchors.

Clause 9. The method of clause 8 further comprising sending a message to the prospective new Global-Anchor via downstream communication in the first control phase; receiving an acknowledgement from the prospective new Global-Anchor during the upstream communication of the second control phase; and determining a slot schedule for a third control phase, subsequent to the second control phase, wherein the downstream and upstream communication allocated in slot schedule for the third control phase considers the prospective new Global-Anchor as the new Global-Anchor for the network of UWB anchors.

Clause 10. The method of any one of clauses 1-9 wherein the first control phase, the second control phase, or both, comprise: an extended ranging control phase (XRCP), or a beacon-only period (BOP), or a combination thereof.

Clause 11. The method of any one of clauses 1-10 wherein the centrality metric value of the respective Init-Anchor is further indicative of: a type of time source of the respective Init-Anchor, a clock stability of the respective Init-Anchor, a ground truth accuracy of the respective Init-Anchor, a geographic location of the respective Init-Anchor, a prevalence of line-of-sight (LoS) links of the respective Init-Anchor, a quality of a time of arrival (ToA) estimation of the respective Init-Anchor, or a power source of the respective Init-Anchor, or a combination thereof.

Clause 12. A Global-Anchor of a network of ultra-wideband (UWB) anchors, the Global-Anchor comprising: a transceiver; a memory; and one or more processors communicatively coupled with the transceiver and the memory, wherein the one or more processors are configured to: obtain metric information regarding the network of UWB anchors, wherein: the network of UWB anchors comprises a plurality of clusters and a plurality of initiator anchors (Init-Anchors), each cluster comprises a corresponding Init-Anchor, the metric information comprises a centrality metric value of each Init-Anchor of the plurality of Init-Anchors, the centrality metric value of a respective Init-Anchor being indicative of a number of hops of the respective Init-Anchor to other UWB anchors in the network, and the metric information is included in or derived from information communicated from the plurality of Init-Anchors to the Global-Anchor in a first control phase of the network of UWB anchors; determine a slot schedule for a second control phase of the network of UWB anchors, wherein: determining the slot schedule is based on the centrality metric values of the plurality of Init-Anchors; the slot schedule comprises an allocation of time slots of the second control phase among the plurality of Init-Anchors for wireless radio frequency (RF) communication; and the allocation of time slots includes a first set of time slots for upstream communication followed by a second set of time slots for downstream communication; and send the slot schedule via the transceiver to an Init-Anchor of the plurality of Init-Anchors.

Clause 13. The Global-Anchor of clause 12, wherein the one or more processors are configured to send the slot schedule to the Init-Anchor of the plurality of Init-Anchors during a time slot in a set of time slots in the first control phase allocated for downstream communications.

Clause 14. The Global-Anchor of any one of clauses 12-13 wherein the one or more processors are configured to allocate the time slots of the first set of time slots among the plurality of Init-Anchors in order of decreasing centrality metric values.

Clause 15. The Global-Anchor of any one of clauses 12-14 wherein the one or more processors are configured to allocate the time slots of the second set of time slots among the plurality of Init-Anchors in order of increasing centrality metric values.

Clause 16. The Global-Anchor of any one of clauses 12-15 wherein the one or more processors are configured to include, in the slot schedule, a set of buffer time slots in which new Init-Anchors can communicate to join the network of UWB anchors.

Clause 17. The Global-Anchor of clause 16 wherein the one or more processors are configured to determine the slot schedule such that the set of buffer time slots precedes the first set of time slots.

Clause 18. The Global-Anchor of any one of clauses 12-17 wherein the one or more processors are configured to allocate at least one time slot in the slot schedule to one new Init-Anchor, responsive to a communication to join the network of UWB anchors from at least one new Init-Anchor, wherein the communication is in a buffer time slot in the first control phase.

Clause 19. The Global-Anchor of any one of clauses 12-18 wherein the one or more processors are configured to determine a prospective new Global-Anchor is based on the centrality metrics of the plurality of Init-Anchors.

Clause 20. The Global-Anchor of clause 19 wherein the one or more processors are configured to: send a message via the transceiver to the prospective new Global-Anchor via downstream communication in the first control phase; receive an acknowledgement via the transceiver from the prospective new Global-Anchor during the upstream communication of the second control phase; and determine a slot schedule for a third control phase, subsequent to the second control phase, wherein the downstream and upstream communication allocated in slot schedule for the third control phase considers the prospective new Global-Anchor as the new Global-Anchor for the network of UWB anchors.

Clause 21. The Global-Anchor of any one of clauses 12-20 wherein the first control phase, the second control phase, or both, comprise: an extended ranging control phase (XRCP), or a beacon-only period (BOP), or a combination thereof.

Clause 22. The Global-Anchor of any one of clauses 12-21 wherein the centrality metric value of the respective Init-Anchor is further indicative of: a type of time source of the respective Init-Anchor, a clock stability of the respective Init-Anchor, a ground truth accuracy of the respective Init-Anchor, a geographic location of the respective Init-Anchor, a prevalence of line-of-sight (LoS) links of the respective Init-Anchor, a quality of a time of arrival (ToA) estimation of the respective Init-Anchor, or a power source of the respective Init-Anchor, or a combination thereof.

Clause 23. A non-transitory computer-readable medium storing instructions for inter-cluster coordination in ultra-wideband (UWB) positioning, the instructions comprising code for: obtaining metric information at a Global-Anchor for a network of UWB anchors comprising a plurality of clusters and a plurality of initiator anchors (Init-Anchors), wherein: each cluster comprises a corresponding Init-Anchor, the metric information comprises a centrality metric value of each Init-Anchor of the plurality of Init-Anchors, the centrality metric value of a respective Init-Anchor being indicative of a number of hops of the respective Init-Anchor to other UWB anchors in the network, and the metric information is included in or derived from information communicated from the plurality of Init-Anchors to the Global-Anchor in a first control phase of the network of UWB anchors; determining, with the Global-Anchor, a slot schedule for a second control phase of the network of UWB anchors, wherein: determining the slot schedule is based on the centrality metric values of the plurality of Init-Anchors; the slot schedule comprises an allocation of time slots of the second control phase among the plurality of Init-Anchors for wireless radio frequency (RF) communication; and the allocation of time slots includes a first set of time slots for upstream communication followed by a second set of time slots for downstream communication; and sending the slot schedule from the Global-Anchor to an Init-Anchor of the plurality of Init-Anchors.

Clause 24. The computer-readable medium of clause 23, wherein the instructions further comprise code for sending the slot schedule to the Init-Anchor of the plurality of Init-Anchors during a time slot in a set of time slots in the first control phase allocated for downstream communications.

Clause 25. The computer-readable medium of any one of clauses 23-24 wherein the instructions further comprise code for allocating the time slots of the first set of time slots among the plurality of Init-Anchors in order of decreasing centrality metric values.

Clause 26. The computer-readable medium of any one of clauses 23-25 wherein the instructions further comprise code for allocating the time slots of the second set of time slots among the plurality of Init-Anchors in order of increasing centrality metric values.

Clause 27. The computer-readable medium of any one of clauses 23-26 wherein the instructions further comprise code for allocating including, in the slot schedule, a set of buffer time slots in which new Init-Anchors can communicate to join the network of UWB anchors.

Clause 28. The computer-readable medium of any one of clauses 23-27 wherein the instructions further comprise code for determining a prospective new Global-Anchor is based on the centrality metrics of the plurality of Init-Anchors.

Clause 29. The computer-readable medium of clause 28 wherein the instructions further comprise code for: sending a message to the prospective new Global-Anchor via downstream communication in the first control phase; receiving an acknowledgement from the prospective new Global-Anchor during the upstream communication of the second control phase; and determining a slot schedule for a third control phase, subsequent to the second control phase, wherein the downstream and upstream communication allocated in slot schedule for the third control phase considers the prospective new Global-Anchor as the new Global-Anchor for the network of UWB anchors.

Clause 30. An apparatus for inter-cluster coordination in ultra-wideband (UWB) positioning, the apparatus comprising: means for obtaining metric information at a Global-Anchor for a network of UWB anchors comprising a plurality of clusters and a plurality of initiator anchors (Init-Anchors), wherein: each cluster comprises a corresponding Init-Anchor, the metric information comprises a centrality metric value of each Init-Anchor of the plurality of Init-Anchors, the centrality metric value of a respective Init-Anchor being indicative of a number of hops of the respective Init-Anchor to other UWB anchors in the network, and the metric information is included in or derived from information communicated from the plurality of Init-Anchors to the Global-Anchor in a first control phase of the network of UWB anchors; means for determining, with the Global-Anchor, a slot schedule for a second control phase of the network of UWB anchors, wherein: determining the slot schedule is based on the centrality metric values of the plurality of Init-Anchors; the slot schedule comprises an allocation of time slots of the second control phase among the plurality of Init-Anchors for wireless radio frequency (RF) communication; and the allocation of time slots includes a first set of time slots for upstream communication followed by a second set of time slots for downstream communication; and means for sending the slot schedule from the Global-Anchor to an Init-Anchor of the plurality of Init-Anchors.

What is claimed is:

1. A method for inter-cluster coordination in ultra-wideband (UWB) positioning, the method comprising:
obtaining metric information at a Global-Anchor for a network of UWB anchors comprising a plurality of clusters and a plurality of initiator anchors (Init-Anchors), wherein:
each cluster comprises a corresponding Init-Anchor,
the metric information comprises a centrality metric value of each Init-Anchor of the plurality of Init-Anchors, the centrality metric value of a respective Init-Anchor being indicative of a number of hops of the respective Init-Anchor to other UWB anchors in the network, and
the metric information is included in or derived from information communicated from the plurality of Init-Anchors to the Global-Anchor in a first control phase of the network of UWB anchors;
determining, with the Global-Anchor, a slot schedule for a second control phase of the network of UWB anchors, wherein:
determining the slot schedule is based on the centrality metric values of the plurality of Init-Anchors;
the slot schedule comprises an allocation of time slots of the second control phase among the plurality of Init-Anchors for wireless radio frequency (RF) communication; and the allocation of time slots includes a first set of time slots for upstream communication followed by a second set of time slots for downstream communication; and sending the slot schedule from the Global-Anchor to an Init-Anchor of the plurality of Init-Anchors.

2. The method of claim 1, wherein the slot schedule is sent to the Init-Anchor of the plurality of Init-Anchors during a time slot in a set of time slots in the first control phase allocated for downstream communications.

3. The method of claim 1, wherein determining the slot schedule comprises allocating time slots of the first set of time slots among the plurality of Init-Anchors in order of decreasing centrality metric values.

4. The method of claim 1, wherein determining the slot schedule comprises allocating the time slots of the second set of time slots among the plurality of Init-Anchors in order of increasing centrality metric values.

5. The method of claim 1, further comprising including, in the slot schedule, a set of buffer time slots in which new Init-Anchors can communicate to join the network of UWB anchors.

6. The method of claim 5, wherein the set of buffer time slots precedes the first set of time slots.

7. The method of claim 1, wherein determining the slot schedule comprises allocating at least one time slot in the slot schedule to one new Init-Anchor, responsive to at least one new Init-Anchor communicating in a buffer time slot of the first control phase to join the network of UWB anchors.

8. The method of claim 1, further comprising determining a prospective new Global-Anchor is based on the centrality metrics of the plurality of Init-Anchors.

9. The method of claim 8, further comprising:
sending a message to the prospective new Global-Anchor via downstream communication in the first control phase;
receiving an acknowledgement from the prospective new Global-Anchor during the upstream communication of the second control phase; and
determining a slot schedule for a third control phase, subsequent to the second control phase, wherein the downstream and upstream communication allocated in slot schedule for the third control phase considers the prospective new Global-Anchor as the new Global-Anchor for the network of UWB anchors.

10. The method of claim 1, wherein the first control phase, the second control phase, or both, comprise:
an extended ranging control phase (XRCP), or
a beacon-only period (BOP), or
a combination thereof.

11. The method of claim 1, wherein the centrality metric value of the respective Init-Anchor is further indicative of:
a type of time source of the respective Init-Anchor,
a clock stability of the respective Init-Anchor,
a ground truth accuracy of the respective Init-Anchor,
a geographic location of the respective Init-Anchor,
a prevalence of line-of-sight (LoS) links of the respective Init-Anchor,
a quality of a time of arrival (ToA) estimation of the respective Init-Anchor, or
a power source of the respective Init-Anchor, or
a combination thereof.

12. A Global-Anchor of a network of ultra-wideband (UWB) anchors, the Global-Anchor comprising:
a transceiver;
a memory; and
one or more processors communicatively coupled with the transceiver and the memory, wherein the one or more processors are configured to:
obtain metric information regarding the network of UWB anchors, wherein:
the network of UWB anchors comprises a plurality of clusters and a plurality of initiator anchors (Init-Anchors),
each cluster comprises a corresponding Init-Anchor,
the metric information comprises a centrality metric value of each Init-Anchor of the plurality of Init-Anchors, the centrality metric value of a respective Init-Anchor being indicative of a number of hops of the respective Init-Anchor to other UWB anchors in the network, and
the metric information is included in or derived from information communicated from the plurality of Init-Anchors to the Global-Anchor in a first control phase of the network of UWB anchors;
determine a slot schedule for a second control phase of the network of UWB anchors, wherein:
determining the slot schedule is based on the centrality metric values of the plurality of Init-Anchors;
the slot schedule comprises an allocation of time slots of the second control phase among the plurality of Init-Anchors for wireless radio frequency (RF) communication; and
the allocation of time slots includes a first set of time slots for upstream communication followed by a second set of time slots for downstream communication; and
send the slot schedule via the transceiver to an Init-Anchor of the plurality of Init-Anchors.

13. The Global-Anchor of claim 12, wherein the one or more processors are configured to send the slot schedule to the Init-Anchor of the plurality of Init-Anchors during a time slot in a set of time slots in the first control phase allocated for downstream communications.

14. The Global-Anchor of claim 12, wherein the one or more processors are configured to allocate the time slots of the first set of time slots among the plurality of Init-Anchors in order of decreasing centrality metric values.

15. The Global-Anchor of claim 12, wherein the one or more processors are configured to allocate the time slots of the second set of time slots among the plurality of Init-Anchors in order of increasing centrality metric values.

16. The Global-Anchor of claim 12, wherein the one or more processors are configured to include, in the slot schedule, a set of buffer time slots in which new Init-Anchors can communicate to join the network of UWB anchors.

17. The Global-Anchor of claim 16, wherein the one or more processors are configured to determine the slot schedule such that the set of buffer time slots precedes the first set of time slots.

18. The Global-Anchor of claim 12, wherein the one or more processors are configured to allocate at least one time slot in the slot schedule to one new Init-Anchor, responsive to a communication to join the network of UWB anchors from at least one new Init-Anchor, wherein the communication is in a buffer time slot in the first control phase.

19. The Global-Anchor of claim 12, wherein the one or more processors are configured to determine a prospective new Global-Anchor is based on the centrality metrics of the plurality of Init-Anchors.

20. The Global-Anchor of claim 19, wherein the one or more processors are configured to:
  send a message via the transceiver to the prospective new Global-Anchor via downstream communication in the first control phase;
  receive an acknowledgement via the transceiver from the prospective new Global-Anchor during the upstream communication of the second control phase; and
  determine a slot schedule for a third control phase, subsequent to the second control phase, wherein the downstream and upstream communication allocated in slot schedule for the third control phase considers the prospective new Global-Anchor as the new Global-Anchor for the network of UWB anchors.

21. The Global-Anchor of claim 12, wherein the first control phase, the second control phase, or both, comprise:
  an extended ranging control phase (XRCP), or
  a beacon-only period (BOP), or
  a combination thereof.

22. The Global-Anchor of claim 12, wherein the centrality metric value of the respective Init-Anchor is further indicative of:
  a type of time source of the respective Init-Anchor,
  a clock stability of the respective Init-Anchor,
  a ground truth accuracy of the respective Init-Anchor,
  a geographic location of the respective Init-Anchor,
  a prevalence of line-of-sight (LoS) links of the respective Init-Anchor,
  a quality of a time of arrival (ToA) estimation of the respective Init-Anchor, or
  a power source of the respective Init-Anchor, or
  a combination thereof.

23. A non-transitory computer-readable medium storing instructions for inter-cluster coordination in ultra-wideband (UWB) positioning, the instructions comprising code for:
  obtaining metric information at a Global-Anchor for a network of UWB anchors comprising a plurality of clusters and a plurality of initiator anchors (Init-Anchors), wherein:
    each cluster comprises a corresponding Init-Anchor,
    the metric information comprises a centrality metric value of each Init-Anchor of the plurality of Init-Anchors, the centrality metric value of a respective Init-Anchor being indicative of a number of hops of the respective Init-Anchor to other UWB anchors in the network, and
    the metric information is included in or derived from information communicated from the plurality of Init-Anchors to the Global-Anchor in a first control phase of the network of UWB anchors;
  determining, with the Global-Anchor, a slot schedule for a second control phase of the network of UWB anchors, wherein:
    determining the slot schedule is based on the centrality metric values of the plurality of Init-Anchors;
    the slot schedule comprises an allocation of time slots of the second control phase among the plurality of Init-Anchors for wireless radio frequency (RF) communication; and
    the allocation of time slots includes a first set of time slots for upstream communication followed by a second set of time slots for downstream communication; and
  sending the slot schedule from the Global-Anchor to an Init-Anchor of the plurality of Init-Anchors.

24. The computer-readable medium of claim 23, wherein the instructions further comprise code for sending the slot schedule to the Init-Anchor of the plurality of Init-Anchors during a time slot in a set of time slots in the first control phase allocated for downstream communications.

25. The computer-readable medium of claim 23, wherein the instructions further comprise code for allocating the time slots of the first set of time slots among the plurality of Init-Anchors in order of decreasing centrality metric values.

26. The computer-readable medium of claim 23, wherein the instructions further comprise code for allocating the time slots of the second set of time slots among the plurality of Init-Anchors in order of increasing centrality metric values.

27. The computer-readable medium of claim 23, wherein the instructions further comprise code for allocating including, in the slot schedule, a set of buffer time slots in which new Init-Anchors can communicate to join the network of UWB anchors.

28. The computer-readable medium of claim 23, wherein the instructions further comprise code for determining a prospective new Global-Anchor is based on the centrality metrics of the plurality of Init-Anchors.

29. The computer-readable medium of claim 28, wherein the instructions further comprise code for:
  sending a message to the prospective new Global-Anchor via downstream communication in the first control phase;
  receiving an acknowledgement from the prospective new Global-Anchor during the upstream communication of the second control phase; and
  determining a slot schedule for a third control phase, subsequent to the second control phase, wherein the downstream and upstream communication allocated in slot schedule for the third control phase considers the prospective new Global-Anchor as the new Global-Anchor for the network of UWB anchors.

30. An apparatus for inter-cluster coordination in ultra-wideband (UWB) positioning, the apparatus comprising:
  means for obtaining metric information at a Global-Anchor for a network of UWB anchors comprising a plurality of clusters and a plurality of initiator anchors (Init-Anchors), wherein:
    each cluster comprises a corresponding Init-Anchor,
    the metric information comprises a centrality metric value of each Init-Anchor of the plurality of Init-Anchors, the centrality metric value of a respective Init-Anchor being indicative of a number of hops of the respective Init-Anchor to other UWB anchors in the network, and
    the metric information is included in or derived from information communicated from the plurality of Init-Anchors to the Global-Anchor in a first control phase of the network of UWB anchors;
  means for determining, with the Global-Anchor, a slot schedule for a second control phase of the network of UWB anchors, wherein:
    determining the slot schedule is based on the centrality metric values of the plurality of Init-Anchors;
    the slot schedule comprises an allocation of time slots of the second control phase among the plurality of Init-Anchors for wireless radio frequency (RF) communication; and
    the allocation of time slots includes a first set of time slots for upstream communication followed by a second set of time slots for downstream communication; and means for sending the slot schedule from the Global-Anchor to an Init-Anchor of the plurality of Init-Anchors.

\* \* \* \* \*